US008732205B2

(12) United States Patent
Guo et al.

(10) Patent No.: US 8,732,205 B2
(45) Date of Patent: May 20, 2014

(54) UNIVERSAL DEVICE IDENTIFIER FOR GLOBALLY IDENTIFYING AND BINDING DISPARATE DEVICE IDENTIFIERS TO THE SAME MOBILE DEVICE

(75) Inventors: Hui Guo, Santa Clara, CA (US); Venkatachary Srinivasan, Sunnyvale, CA (US); Surendra Sadanand Rajam, Sunnyvale, CA (US); Zhaowei Charlie Jiang, Palo Alto, CA (US); Min Zhou, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/251,963

(22) Filed: Oct. 3, 2011

(65) Prior Publication Data

US 2012/0023114 A1 Jan. 26, 2012

Related U.S. Application Data

(63) Continuation of application No. 12/130,939, filed on May 30, 2008, now Pat. No. 8,037,097.

(51) Int. Cl.
*G06F 7/00* (2006.01)
*G06F 17/30* (2006.01)

(52) U.S. Cl.
USPC .......................................... 707/792; 707/796

(58) Field of Classification Search
CPC ........ G06F 13/102; G06F 13/385; G06F 9/44
USPC .......................................... 707/792, 793, 796
See application file for complete search history.

(56) References Cited

U.S. PATENT DOCUMENTS

| 5,761,496 | A | 6/1998 | Hattori |
| 5,787,414 | A | 7/1998 | Miike et al. |
| 6,658,582 | B1 * | 12/2003 | Han .............................. 713/500 |
| 6,662,358 | B1 * | 12/2003 | Berry et al. ................... 717/128 |
| 6,671,727 | B1 * | 12/2003 | Odenwald ..................... 709/227 |
| 7,302,448 | B2 | 11/2007 | Schwendiman et al. |
| 7,318,057 | B2 | 1/2008 | Aridor et al. |
| 7,493,214 | B2 | 2/2009 | Jung et al. |
| 7,685,293 | B2 | 3/2010 | Deshpande et al. |

(Continued)

OTHER PUBLICATIONS

Office Communication for U.S. Appl. No. 12/130,939 mailed Oct. 20, 2010.

(Continued)

*Primary Examiner* — Pavan Mamillapalli
(74) *Attorney, Agent, or Firm* — James J. DeCarlo; Greenberg Traurig, LLP

(57) ABSTRACT

Embodiments of the invention are directed to determining a universal device identifier (UDID) for a client device, based on multiple service-dependent identifiers (SDIDs) used by client applications, websites, or other services to identify the client device. SDID types are prioritized with pre-assigned weights. A received SDID causes a single database read to access all other SDIDs, and any existing UDID(s) associated with the client device. A final UDID is created or selected based on the SDID weights. The database is updated in a sequence that enables self recovery of a prior UDID in case of database error during update. First, any non-selected UDID records are updated with the final UDID. Next, lower weighted SDID records are updated. The final UDID record is updated. The highest weighted SDID record is updated last, to preserve the prior UDID as long as possible in case of update error, which aborts the remaining update.

5 Claims, 9 Drawing Sheets

(56) References Cited

U.S. PATENT DOCUMENTS

| | | |
|---|---|---|
| 7,809,708 B2 | 10/2010 | Aridor et al. |
| 2005/0021539 A1 | 1/2005 | Short |
| 2005/0192035 A1 | 9/2005 | Jiang |
| 2007/0276915 A1 | 11/2007 | Setlow et al. |
| 2008/0021837 A1* | 1/2008 | Chang et al. .................. 705/58 |
| 2008/0147644 A1* | 6/2008 | Aridor et al. .................. 707/5 |
| 2009/0300066 A1 | 12/2009 | Guo et al. |
| 2010/0115123 A1 | 5/2010 | Airamo |

OTHER PUBLICATIONS

Office Communication for U.S. Appl. No. 12/130,939 mailed Jun. 9, 2011.

* cited by examiner

UNIVERSAL DEVICE IDENTIFIER FOR GLOBALLY IDENTIFYING AND BINDING DISPARATE DEVICE IDENTIFIERS TO THE SAME MOBILE DEVICE

CROSS-REFERENCE TO RELATED APPLICATIONS

This Application is a Continuation Patent Application of U.S. patent application Ser. No. 12/130,939, filed on May 30, 2008, entitled "Universal Device Identifier For Globally Identifying And Binding Disparate Device Identifiers To The Same Mobile Device," the benefit of the earlier filing date of which is hereby claimed under 35 U.S.C. §120 and which is further incorporated herein by reference in its entirety.

FIELD OF ART

The present invention is directed to associating separately identified actions with a single device, and more particularly, to determining that interactions with multiple services are related, and linking the interactions to a single device with a common identifier.

BACKGROUND

Mobile devices are often used in a more personal manner than a general computing device. Thus, a mobile device is often considered more personal to a particular user than a general computing device, which may be used by multiple people. Mobile devices are often identified in different ways for different services. For example, a mobile communications carrier may identify a mobile device with a mobile identification number (MIN) that the carrier assigns for a corresponding subscriber of the carrier services. When the mobile device is running a browser application and requests a web page from a mobile web server, a mobile communications carrier gateway typically relays the MIN between the mobile web server and the mobile device to route the request and response. Accordingly, MINs are also generally used by the mobile web server to identify individual devices so as to track web requests from millions of devices and build business intelligence. A carrier gateway acts as a proxy between a mobile device and a mobile web server by forwarding requests from the device to the server and returning responses including pages from the server to the device. Although the MIN may be used by the web server, the MIN for a device is generally managed by a carrier, which associates the MIN to the appropriate requesting subscriber. A service provider, such as web portal, and a communications carrier can have an agreement to use MINs to identify traffic and requests from devices used by subscribers. Generally, a carrier forwards a MIN as part of a request from a device to a web server of the service provider. More specifically, a request is typically routed along a path from a device to a carrier gateway and to the destination web server. The carrier gateway may insert an indirect service-dependent ID such as the MIN into the original request to the web server. Similarly, the MIN can be used for legacy browsers that do not support browser cookies (bcookies), because they communicate through a carrier access network. In general, a MIN can also be used with other client-server applications.

However, other service-dependent identifiers can also be used for other communication channels. For example, if a device requests web services via a WiFi network, which does not go through a carrier access network, some mechanisms other than a MIN may be needed to identify the device. In this case, a browser cookie, a device IP address, or other service-dependent identifier may be needed.

Similarly, when a subscriber's same mobile device is running another application, such as a J2ME-based client application, the mobile device typically sends a client ID, rather than a MIN, when requesting a service from an application server. The client ID generally identifies the client application running on the client, but the client application and the application server are not necessarily aware that the client ID and the MIN are associated with the same mobile device. Examples of such applications include an instant messaging application, an email application, a photo management application, and the like. As another alternative, the same mobile device may send a mobile station international services digital network (MSISDN) number, rather than an MIN or a client ID, to a short message service (SMS) server for SMS services. An MSISDN number generally identifies a subscriber on a mobile communication network, such as a global system for mobile communications (GSM) network.

In many cases, a service provider uses only one identifier, because the service provider only provides one service. But some mobile service providers offer a combination of mobile web services, J2ME-client applications, SMS services, and/or other services. Because each service uses a different identifier, it is difficult to recognize that the services are being provided to the same mobile device though various channels. Also, one or more of the above service-dependent identifiers may change relative to the mobile device. For example, a subscriber may purchase a different mobile device, which runs different client applications, but the new mobile device may be associated with the subscriber's prior MIN. Some multi-service mobile service providers associate the various services to a single user id. But, a user of one mobile device, may have multiple user IDs for different services, such as email services, instant messaging services, etc. Also, a user ID usually requires a mobile device user to log in before using a service, and often requires a user to specify the associations in a user profile, or the provider must deduce the associations while the user is logged in. These are extra steps that mobile device users often prefer not to perform. For example, many users access a service, such as a weather website, without logging in. Such users typically do not register for a user ID and typically do not register their device. However, such web services often leave a cookie with an identifier on the user's device. The same user may register for a user ID for an email service, but may not register the specific device. For multi-service providers, it is useful to determine which interactions occur with the same mobile device. However, trying to relate a large volume of interactions can reduce response times to the client devices, which can result in an undesirable user experience. It is with respect to these considerations and others that the present invention is directed.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description Of Example Embodiments, which is to be read in association with the accompanying drawings, wherein.

DETAILED DESCRIPTION OF EXAMPLE EMBODIMENTS

Figure 1:
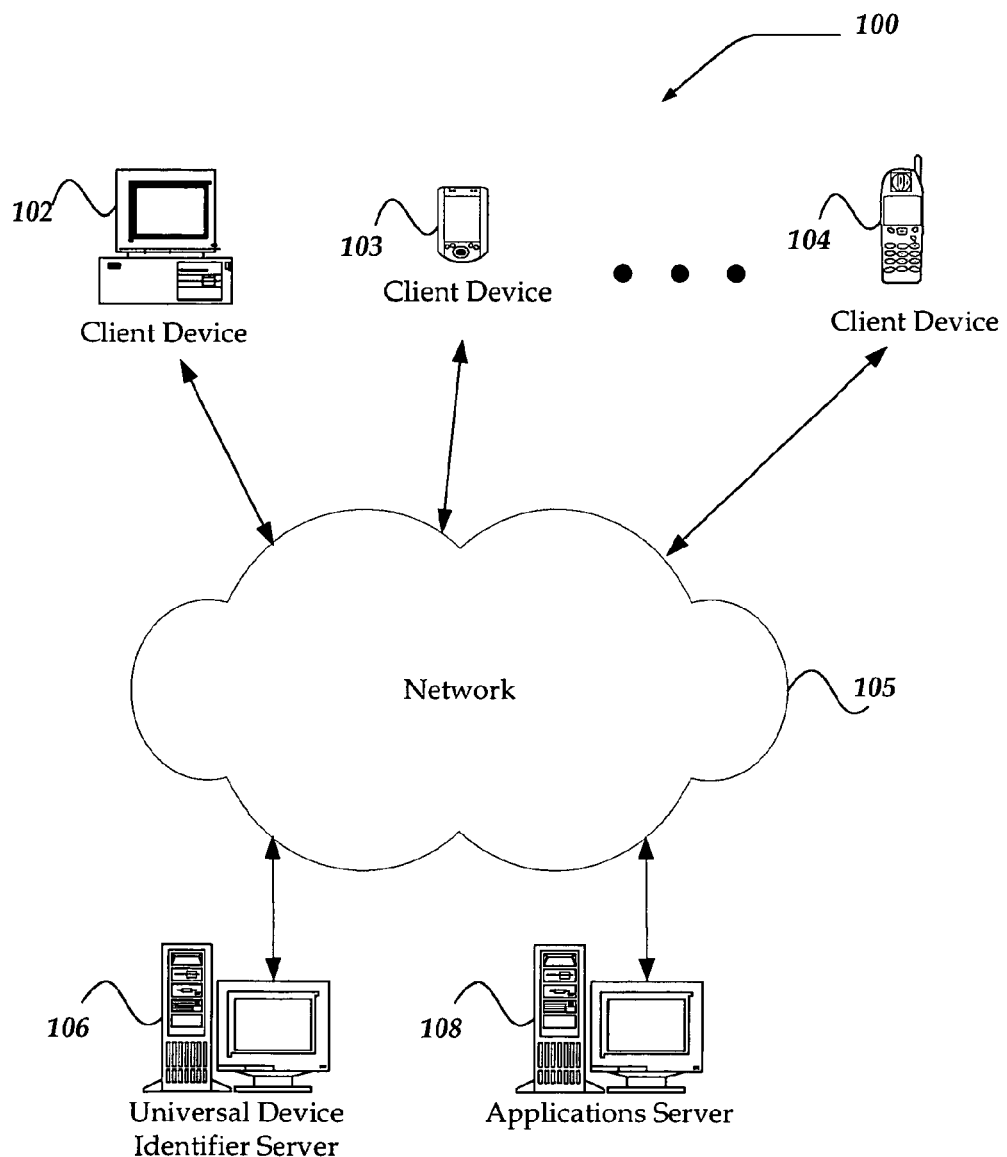
FIG. 1 illustrates a diagram of one embodiment of an example system in which the invention may be practiced.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

A number of acronyms are used herein. They are listed and described in the following Table 1 of acronyms.

TABLE 1

| Acronym | Description |
| --- | --- |
| BCookie | Browser Cookie |
| CarrierCat | Carrier Catalog |
| DB | Database |

TABLE 1-continued

| Acronym | Description |
| --- | --- |
| DevCat | Device Catalog |
| IMEI | International Mobile Equipment Identity |
| MIN | Mobile Identification Number |
| MMS | Multimedia Messaging Service |
| MSISDN | Mobile Subscriber Integrated Services Digital Network Number |
| SDID | Service-Dependent ID |
| SMS | Short Message Service |
| YGOID | A Client ID for Yahoo Go Client |
| UDB | User Database |
| UDID | Universal Device ID |

Briefly stated, the invention is directed to determining a common device identifier for a mobile device, based on hints from the use of mobile services and applications. The common identifier is referred to herein as a Universal Device Identifier (UDID). Embodiments of a UDID system create and maintain a UDID for every mobile device. Embodiments generally record all identifiers associated with a mobile device, and bind these IDs for the same device with a UDID data structure whenever possible. This UDID is generally a unique and global identification for a device across mobile applications.

Communication with a mobile device can be performed with various identifiers, which are referred to herein as Service-Dependent Identifiers (SDIDs), depending on different services, applications, or associations. A service-dependent ID identifies a device in the context of an online service, client application, channel, or other service. One embodiment is directed to identifying a device, which may be associated with one or more online services, applications, channels, or other services. If a device runs a browser, a J2ME-client, and an email client, and/or other applications, the same device may be associated with multiple IDs. Consequently, this single device is counted multiple times if the service-dependent IDs are not merged together. As indicated above, an SDID can be a Mobile Identification Number (MIN), a Mobile Equipment Identity (IMEI), a Mobile Subscriber Integrated Services Digital Network Number (MSISDN) number, a Client ID (e.g., YGoId), a browser cookie (BCookie), or the like. For instance, a MIN or a BCookie can be used to identify a mobile device as a client when the mobile device is running a mobile web browser application. An IMEI can be used to identify a client application on a mobile device when the mobile device is running other client applications. A MSISDN can be used to identify a mobile device when the mobile device is using SMS services.

Embodiments of the present invention provide and use a universal device identifier. When a request from a device is received by a UDID system, the system uses an SDID in the request, to lookup a UDID. Examples of three UDID lookup scenarios illustrate further aspects of embodiments of the invention.

First, if a valid UDID is found, this UDID is returned for this request. A valid UDID generally means this UDID is already associated with (already binds with) all SDIDs in the received request.

Second, if no UDID is found, a new UDID is created and returned for this received request. This new UDID binds with all SDIDs in the received request and is stored in a database for future reference.

Third, multiple UDIDs are found using SDIDs in a received request. In this case, a UDID merge occurs and a merged UDID is returned in response to this request. The merged UDID binds with all SDIDs in the request and is stored in database for future reference.

Some embodiments of a UDID comprise an alphabetic string with seven characteristics; namely a UDID is unique, universal, authenticated, persistent, traceable, visible and evolving. More specifically, embodiments of a UDID are unique for every device. A UDID is universal across all applications for the same device. A UDID is authenticated with a signature when it is created. A UDID is persistent and is stored in database. A UDID is traceable with a version number, a timestamp for creation, a timestamp for modification, or other version indicator. A UDID is visible and can be retrieved from database using an SDID. Multiple UDIDs for the same device can be evolved and merged into a single UDID for the device. Some embodiments of UDIDs may have differing combinations of fewer than all of the above characteristics, or other characteristics.

A UDID is generally generated using an algorithm that can provide the UDID's uniqueness. For example, a random number generator can be seeded with a current date and time to produce a unique UDID. A UDID has a signature to certify its source of generation. This generated UDID is maintained in database for future lookup. For instance, the following is a sample UDID:

52rjs493a25vg&b=3&s=kg

The semantics of this example has 3 parts. The first part is a unique id (i.e., "52rjs493a25vg"). The second part is a version (i.e., "b=3"). The third part is a signature (i.e., "s=kg"). These parts are concatenated by the "&" sign.

To better understand a UDID, it is useful to discuss SDIDs for comparison. Unlike a UDID, an SDID generally does not have all, or a sufficient set of the above characteristics. The criteria for an SDID are generally pre-determined for its corresponding mobile communication channel. Some sample SDIDs are discussed below.

A MIN is generally a mobile subscription number. In mobile web requests, some carrier network operators forward each MIN in an HTTP request header. An IMEI is generally intended to be a true physical device id. However, this number is not always available to a mobile service provider, such as a website service. Sometimes an IMEI is present in a J2ME-based client application. In this case, the device may be identified by IMEI. A ClientId is often based on an IMEI. For example, when a device IMEI is not available in a J2ME-based request, a ClientId is assigned by an application server to identify this device. An MSISDN is typically an actual phone number. Phone numbers are often reassigned to new subscribers, or transferred to a new device by the same subscriber. An MSISDN is typically used for SMS service. A BCookie is a common mechanism used by web services to identify a browser. Assuming a device has only one browser, a BCookie can be used to identify a mobile device without requiring a user to provide any identifier. However, not all mobile browsers support bcookies. Other mobile applications such as AJAX or FLASH may have other identifier for the same device in addition to MSISDN, IMEI, MIN, or other SDIDs. It is also possible that a mobile device is identified by a fixed IP-address for IP-based applications, such as Wi-Fi communications applications.

A generally accurate way to identify a device is through device registration. Device registration generally involves actively providing an MSISDN and/or other SDID to a mobile service provider. However, not all mobile devices will be registered with all (or any) mobile service providers. Also, some SDIDs may identify other types of mobile and non-mobile devices, such as internet-connected TV sets, set top boxes, media entertainment controller, network-capable digital cameras, home appliances, or the like.

Embodiments of the invention can use weights assigned to SDIDs. Initially, an individual UDID binds with an individual SDID from a communication request. If multiple SDIDs are used for different forms of communication, each SDID will bind with a different UDID, because the UDID system does not yet know they are related. Later, multiple SDIDs may be included in one request. For instance, a request may be populated with SDIDs read from a bcookie that was written with different SDIDs for each mobile device access to a multi-service provider, such as a web portal. If each SDID is bound to a different UDID, but both identify the same mobile device, the higher weighted SDID can determine which UDID is selected to identify that mobile device. In one embodiment, the list of SDIDs is pre-selected and each SDID weight is pre-defined by a system administrator. Each weight can be based on the administrator's priority level for each type of communication channel, determined from historical traffic data, or other heuristic information. Thus, an SDID weight can be subjective. For example, a system administrator may specify that a MIN has a higher weight than IMEI; an IMEI has a high weight than a MSISDN; an MSISDN has a higher weight than a CleintID; and a ClientID has a higher weight than a BCookie. Accordingly, an example weighted SDID list looks like: "MIN, IMEI, MSISDN, ClientID, BCookie." The administrator can add or delete SDIDs and adjust each SDID weight. If an SDID has a higher weight, its corresponding UDID has more chance to be selected as the ultimate UDID during a UDID merge for a mobile device.

The UDID merge process generally accesses a lookup database that stores associations between SDIDs and UDIDs. Some UDID systems, such as those that handle a relatively small volume of interactions, may choose a normalized database that supports built-in database transactions. However, an example embodiment that handles millions of mobile service requests in real time (e.g., approximately one hundred requests per second), uses a file system based database. A file system based database includes some advantages for handling large volumes of communications between many mobile devices and multiple services. Some of those advantages include efficient queries and quick scaling for global roll out. Fast query is valuable to ensure operation efficiency and fast response time for large volumes of requests. In this embodiment, a schema is also designed so that every SDID and UDID for a device becomes a database key. Rather than the conventional database design of relationally linking the keys, all keys for a device are instead stored in all records for the device. In this way, a single database read retrieves all keys for the device, regardless of which SDID or UDID is received in a request. In one embodiment, a large majority of database operations involves searching for an existing UDID. Rather than relationally link through one or more received SDIDs to find a UDID, a single database read can access an existing UDID in the large majority of cases. This minimizes extra database processing to those circumstances when a new UDID should be created or multiple UDIDs should be merged.

Table 2 illustrates one example of a fast-query schema in a lookup database. In this example, six records are associated with the same mobile device. There are five records corresponding to five different SDIDs, and one record corresponding to a UDID. As shown in the table, the key of the MIN record is MIN with value "m1." This record has five SDID fields; namely an IMEI field with a value of "i1," an MSISDN field with a value of "s1," a ClientID field with a value of "c1," and a BCookie field with a value of "b1." The one UDID field has a value of "u1." A read to the MIN record or any other record provides all of the current SDID field and UDID field values associated with the device.

In one embodiment, a UDID version number, creation time, modification time, requested client, or other information is also stored in the database for traceability. The creation time generally indicates the time when an UDID is created. The modification time generally indicates when the latest UDID merge happens. The version number and time stamps are generally used to trace UDID history. The UDID client can be a mobile web client, a device registration client, or the like. The above four fields are not illustrated in Table 2, but these and other fields can be added to records to track useful information regarding UDID updates when database writes occur.

TABLE 2

A Sample Data Structure For A Fast-Query Schema

| Record MIN = m1 | UDID = u1 |
| | IMEI = i1 |
| | MSISDN = s1 |
| | ClientID = c1 |
| | BCookie = b1 |
| Record IMEI = i1 | MIN = m1 |
| | UDID = u1 |
| | MSISDN = s1 |
| | ClientID = c1 |
| | BCookie = b1 |
| Record MSISDN = s1 | MIN = m1 |
| | IMEI = i1 |
| | UDID = u1 |
| | ClientID = c1 |
| | BCookie = b1 |
| Record ClientID = c1 | MIN = m1 |
| | IMEI = i1 |
| | MSISDN = s1 |
| | UDID = u1 |
| | BCookie = b1 |
| Record BCookie = b1 | MIN = m1 |
| | IMEI = i1 |
| | MSISDN = s1 |
| | ClientID = c1 |
| | UDID = u1 |
| Record UDID = u1 | MIN = m1 |
| | IMEI = i1 |
| | MSISDN = s1 |
| | ClientID = c1 |
| | BCookie = b1 |

For most requests from a device, an embodiment of a UDID system performs a quick lookup and returns the currently known SDIDs and UDID. A few initial requests from a device involve creating a UDID. A few other requests involve merging UDIDs (e.g., selecting one UDID). UDID creation and UDID merge trigger several database read/write operations which can slow down the system somewhat. During such a delay, it is possible that another request is received. If the UDID system has not finished creating a new UDID, or has not finished selecting one UDID from multiple UDIDs, the UDID system may not be able to return the proper UDID in response to the subsequent request.

To address this issue, an embodiment of the UDID system provides self-recovery. The self-recovery mechanism restores the database to a consistent state without requiring database transaction support. In one embodiment, the UDID system uses incoming requests to trigger a self-recovery process. In this embodiment, the UDID system does not have state information, because it uses a file system database. In that case, every request triggers the same overall process. During that process, the UDID determines whether the request requires creating a new UDID or merging multiple UDIDs (e.g., selecting one of the multiple UDIDs). If either of those operations is required, a new, or updated UDID is determined, and then a database update begins.

In one embodiment, if a database error occurs after UDID creation begins, but the new UDID is not stored, or the SDID records are not updated, the UDID creation is aborted and the newly created UDID for this device is generally lost. For example, if creating a new UDID exceeds response-time requirements that may be needed for the system to handle the very large volume of requests, or if a subsequent request is received during the UDID creation, the UDID system aborts the UDID creation. In this case, the UDID system performs further operations as if the request to create a UDID for this device did not occur. The UDID database returns to its prior consistent state. Sometime later, another request from the mobile device triggers another UDID creation operation. If this creation operation completes successfully, the SDID records are updated with the second created UDID and the second created UDID is stored in the database.

Similarly, if a request causes a UDID merge operation, and the database fails to update properly during the UDID merge, database records for this request are considered to be in an inconsistent state. For example, during a UDID merge process, another request may be received, or the UDID merge can not be handled within the response-time requirements that may be needed for the system to handle the very large volume of requests. As with the UDID creation process, the UDID merge process is aborted. It is then unclear which UDID would have been selected, so the database is in an inconsistent state. However, a future incoming request with the same SDID from the same device will again trigger the UDID merge operation. If this second merge operation completes correctly, the UDID system overwrites the inconsistent records, putting the database back into a consistent state. After this self-correction, subsequent requests use the UDID lookup process as usual to access the newly selected UDID.

To provide self-recovery capability, the UDID process updates the records in a counter-intuitive order. It is logical to try to determine and update a UDID record for a newly created UDID or a merged UDID as quickly as possible, before updating other database records. However, if a database error occurs during UDID creation or merger, the newly created or merged UDID may not be reliable with the other SDID records. This could prevent self-recovery. Thus, one embodiment uses the following counter-intuitive database update order to write the updates to the database. In one embodiment, the UDID system uses the received SDID to access associated records stored in the database and copy those associated records into memory. Updates are first performed on the memory copy records. If an error occurs during memory update, the memory copy records can be discarded and future requests are processed using the prior stored records in the database. In many cases, the UDID system will soon receive another request from the same mobile device with the same SDID(s), because the same mobile device will likely continue communicating with the content or application service. The UDID system can then restart the update process. The UDID system can update the memory copy records in the same order as writing the updates to the database disk. However, in other embodiments, the memory update may be performed in a different order from the database write process.

The update process begins by using predefined SDID weighting or another selection process to determine a new or merged UDID. To begin updating the records with the new or merged UDID, the UDID system first discards invalid SDID/UDID associations from the records. For example, records of lower weighted SDID/UDID associations may be considered invalid, and are discarded. Other criteria can be used to determine what associations should be discarding as invalid. In one embodiment for merging UDIDs, lower weighted SDID/UDID associations are discarded by updating obsolete (e.g., non-selected) UDID record(s). A UDID record is generally considered obsolete if it is a record that does not include the selected UDID during a successful merge operation. For instance, if UDIDs are being merged, and the UDID record (the sixth record) near the bottom of Table 2 is not selected, the SDID/UDID associations in the UDID record are removed. In one embodiment of merged UDIDs, rather than delete this non-selected UDID record, the fields of the non-selected UDID record are updated to associate the SDIDs with the selected UDID. If a later request is received with the non-selected UDID in the request, the request will be "redirected" to the selected UDID.

Second, the UDID system establishes a new association between SDIDs and the newly created or selected UDID. For instance, the UDID system updates each SDID record with a new association to the newly created or selected UDID. Generally, it is desirable to update the SDID records with the latest UDID information before creating or updating a full UDID record with corresponding SDID fields. This is because requests usually include one or more SDIDs rather than a UDID, so SDID records are accessed more frequently than UDID records. Thus, rather than using the second operation step to update the one UDID record with the newly created or selected UDID, the UDID system updates the multiple SDID records with the newly created or selected UDID. In one embodiment, the SDID record with the least weight is updated first. Other SDID records with increasing weights are updateduntil the SDID record with the second highest weight is updated during this phase. If a database write error occurs while writing the lesser weighted SDID records, the highest weighted (e.g., the most frequently used) SDID record will still have the prior UDID, and the UDID system can recover from the error with the prior UDID. As a result of the error, the lesser weighted SDID records will be inconsistent with the highest weighted SDID record. But this inconsistency will generally only last for a short time, because the mobile device is likely to soon send another request with the same SDID or UDID that caused the creation or merge. Thus, the UDID system will soon restart the process of creating a new UDID or merging multiple UDIDs in another attempt to update the records.

In one embodiment, the SDID record with the highest weight will be the SDID record that determines the UDID. Thus, this highest weighted SDID record has effectively the same priority as the final UDID record. Consequently, the highest weighted SDID record can be updated with the newly created or selected UDID as the third operation. But the highest weighted SDID record may be more likely to be accessed again, before the final UDID record. Thus, in one embodiment, the final UDID record can be updated as the third operation, before the highest weighted SDID record. In other words, the third operation is to continue the merge operation by updating the UDID record with the new SDID/UDID associations. In that embodiment, the fourth operation is to update the SDID record that has the highest weight. The order of operations three and operation four is inter changeable. In either case, if an error occurs during the update process, the self-recovery mechanism protects the stored records in the database, and enables future incoming requests to ensure that a device will be identified with a single UDID that is associated with multiple possible SDIDs in multiple possible requests from multiple applications, online services, SMS communications, MMS communication, Email communications, or other services.

In general, embodiments of the invention reduce database operations to minimum. For each request, most cases need only a single database read operation to query for an associated UDID. This single database operation is generally to read an SDID record where its SDID has the highest weight. This provides high speed responses for a very large volume of requests. To maintain response times when additional database operations are needed, embodiments of the invention provide a fast update process that is also recoverable.

As discussed above, rather than first update the UDID record with the newly selected UDID value, so it would be ready for subsequent requests, an embodiment of the UDID system first breaks obsolete associations between the old UDID and the SDIDs. If all update operations are successful, the database is in a consistent state. But, if update operations fail after the first step, the old UDID (or no UDID) is still associated with the SDIDs in the SDID records. If update operations fail after the second or the third step, some SDID records are associated with the old UDID (or no UDID), and some SDID records are associated with the new UDID. Consequently, the client device may be associated with multiple UDIDs (or no UDID). Nevertheless, the UDID system does not fail overall, whether a UDID creation or merge occurs or carries out incompletely. Future similar request restart the creation or merge operation, and the database will be updated accordingly. Consequently, the UDID creation or merge process runs at real-time with self-recovery and scalability.

Illustrative Operating Environment

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, system 100 includes client devices 102-104, network 105, a UDID server 106, and an applications server 108. Network 105 is in communication with and enables communication between each of client devices 102-104, UDID server 106, and applications server 108.

Client devices 102-104 may include virtually any computing device capable of receiving and sending a message over a network, such as network 105, to and from another computing device, such as applications server 108, each other, and the like. The set of such devices may include devices that typically connect using a wireless communications medium such as cell phones, smart phones, pagers, walkie talkies, radio frequency (RF) devices, infrared (IR) devices, citizen band radios CBs, integrated devices combining one or more of the preceding devices, or virtually any mobile device, and the like. Similarly, client devices 102-104 may be any device that is capable of connecting using a wired or wireless communication medium such as a personal digital assistant (PDA), pocket PC, iPhone/iTouch/iPod, Android device, Tablet PC, wearable computer, and any other device that is equipped to communicate over a wired and/or wireless communication medium. The set of such devices may also include devices that typically connect using a wired communications medium such as personal computers, multiprocessor systems, microprocessor-based or programmable consumer electronics, network PCs, and the like.

Each client device within client devices 102-104 may include a browser application that is configured to send, receive, and display web pages, and the like. The browser application may be configured to receive and display graphics, text, multimedia, and the like, employing virtually any web based language, including, but not limited to a Handheld Device Markup Language (HDML), such as Wireless Markup Language (WML), WMLScript, JavaScript, a Standard Generalized Markup Language (SMGL), such as HyperText Markup Language (HTML), extensible markup language (XML), and the like. Client devices 102-104 may further include a messaging application configured to send and/or receive a message to/from another computing device employing another mechanism, including, but not limited to instant messaging (IM), email, Short Message Service (SMS), Multimedia Message Service (MMS), internet relay chat (IRC), mIRC, Jabber, and the like.

Network 105 is configured to couple one computing device to another computing device to enable them to communicate. Network 105 is enabled to employ any form of computer readable media for communicating information from one electronic device to another. Also, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Digital Signal level 3 (DS3), Optical Carrier 3 (OC3), OC12, OC48, Asynchronous Transfer Mode (ATM), Integrated Services Digital Networks (ISDNs), Digital Subscriber Lines (DSLs), wireless links including cellular links, microwave links, satellite links, or other communications links known to those skilled in the art. Furthermore, remote computers and other related electronic devices could be remotely connected to either LANs or WANs via a modem and temporary telephone link. Network 105 is constructed for use with various communication protocols and technologies, including transmission control protocol/internet protocol (TCP/IP), user datagram protocol (UDP), a wireless application protocol (WAP), global system for mobile communications (GSM), universal mobile telecommunication system (UMTS), high speed downlink packet access (HSDPA), code division multiple access (CDMA), evolution data optimized (EV-DO), time division multiple access (TDMA), general packet radio service (GPRS), ultra wide band (UWB), IEEE 802.11 wireless networking (WiFi), IEEE 802.16 worldwide interoperability for microwave access (WiMax), unlicensed mobile access (UMA), and the like. In essence, network 105 includes any communication method by which information may travel between client devices 102-104, UDID server 106, and/or applications server 108.

The media used to transmit information in communication links as described above generally includes any media that can be accessed by a computing device. Computer-readable media may include computer storage media, wired and wireless communication media, or any combination thereof. Additionally, computer-readable media typically embodies computer-readable instructions, data structures, program modules, or other data. Such data can be communicated through communication media using a modulated data signal such as a carrier wave, data signal, or other transport mechanism and includes any information delivery media. By way of example, communication media includes wireless media such as fluids or space for acoustic, RF, infrared, and other wireless signals, and communication media includes wired media such as twisted pair, coaxial cable, fiber optics, wave guides, and other wired media.

UDID server 106 and applications server 108 may comprise multiple computing devices or a single computing device. UDID server 106 may provide administrative services, such as creation, modification, and management of SDIDs, UDIDs, or the like. Applications server 108 may provide similar services and/or other services such as web sites, messaging, search, news, shopping, advertising, online journals (e.g., blogs), photos, reviews, and/or the like. Such services may interact with browser applications that render documents from applications server 108, with client applications that provide their own interface and operations on the client devices, a combination, or the like. For example purposes, the operations of UDID server 106 and applications server 108 may be described together, and generally refer to UDID server 106. Briefly, UDID server 106 may include any computing device capable of connecting to network 105 and may manage device recognition services, content navigation services, usage tracking services, usage analysis services, or other services, for a network user, such as a user of at least one of client devices 102-104. Devices that may operate as UDID server 106 include dedicated servers, personal computers, desktop computers, multiprocessor systems, microprocessor-based or programmable consumer electronics, network PCs, and the like.

UDID server 106 may employ processes such as described in more detail below to create, modify, and otherwise manage data structures of identifiers, content, or other network resources. UDID server 106 also determines profile information for devices and users, provides navigation services for users, enables an administrator to manage profile and navigation information, or processes other device or user related information for users of UDID server 106. UDID server 106 or applications server 108 may also enable users to send, receive, and manage messages. UDID server 106 and/or any of clients 102-104 may be implemented on one or more computing devices, such as a client described with regard to FIG. 2.

Illustrative Client Device

Figure 2:
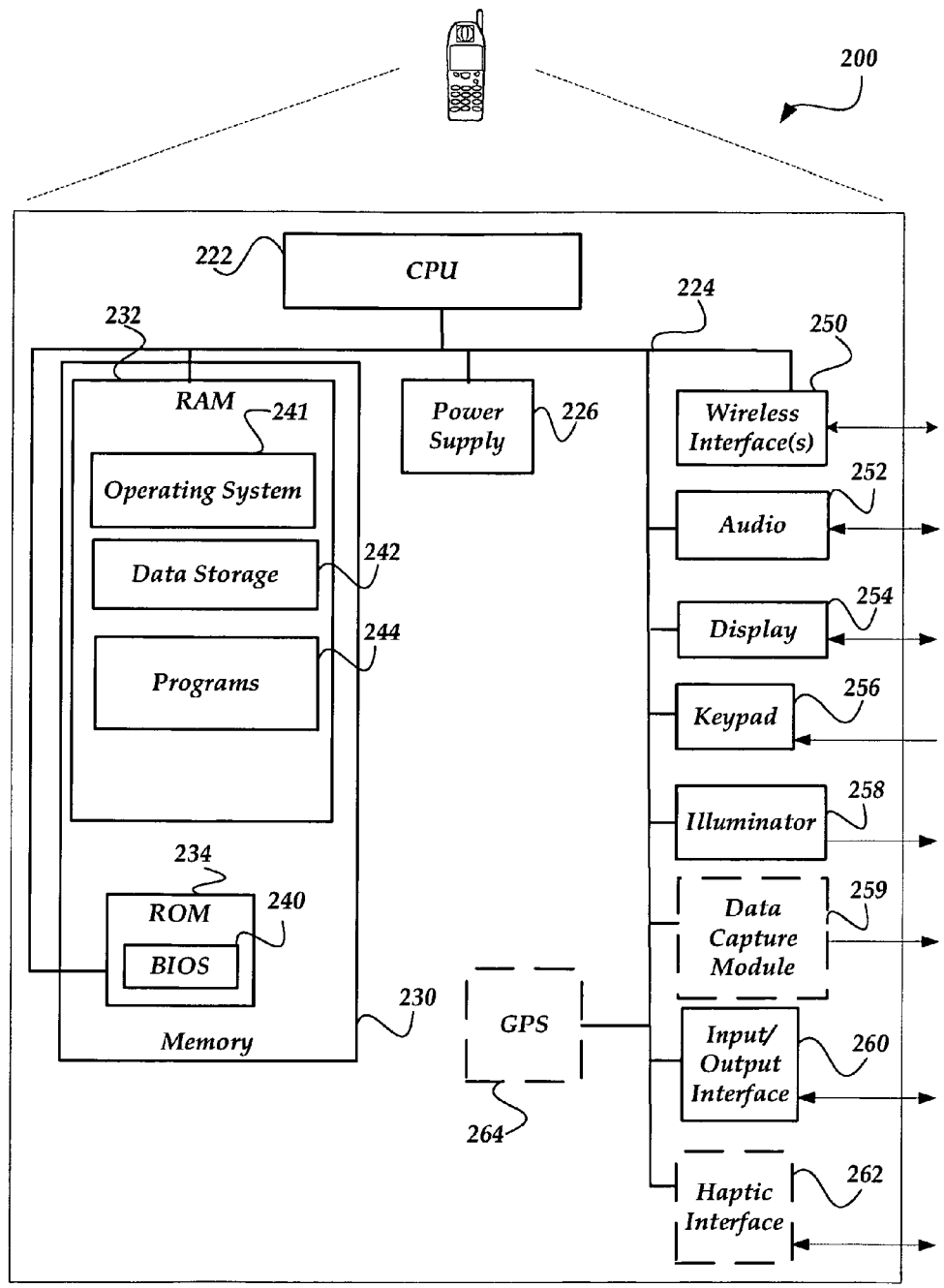
FIG. 2 shows a schematic diagram of one embodiment of an example mobile device.

FIG. 2 shows an example client device 200, according to one embodiment of the invention for use as a reference data collector device. In one embodiment, client device 200 is a mobile device, such as a PDA or a cellular telephone that is arranged to send and receive voice communications and messages via one or more wireless communication interfaces. Oftentimes, mobile electronic devices will be capable of personal communication by connecting to one or more wireless networks, connecting to multiple nodes of a single wireless network, communicating over one or more channels to one or more networks, or otherwise engaging in one or more communication sessions. Generally, client device 200 may comprise any mobile or stationary electronic device. Such devices include cellular telephones, smart phones, PDAs, palmtops, handheld computers, pagers, laptops, radio frequency (RF) devices, infrared (IR) devices, integrated devices combining one or more of the preceding devices, and the like. Client device 200 may also comprise other electronic devices such as personal computers, multiprocessor systems, microprocessor-based or programmable consumer electronics, network PCs, wearable computers, and the like.

Client device 200 may include many more, or fewer, components than those shown in FIG. 2. However, the components shown are sufficient to disclose an illustrative embodiment for practicing the present invention. As shown in the figure, client device 200 includes a processing unit 222 in communication with a mass memory 230 via a bus 224.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a specialized mobile communication operating system such as Windows Mobile™, the Symbian® operating system, or a general purpose operating system such as a version of Windows®, UNIX, or LINUX®, or the like. The operating system may include, or interface with a Java® virtual machine module that enables control of hardware components and/or operating system operations via Java application programs.

Memory 230 further includes one or more data storage units 242, which can be utilized by client device 200 to store, among other things, SDIDs, a UDID, programs 244, and/or other data. Programs 244 may include computer executable instructions which, when executed by client device 200, perform client-side application program operations or stand-alone application program operations. Programs 244 may also transmit, receive, render, and/or otherwise process markup pages such as WAP pages (sometimes referred to as WAP cards), HTML pages, XHTML pages, and the like. Accordingly, programs 244 may include a browser program of computer executable instructions, which may be run under control of operating system 241 to enable and manage requesting, receiving, and rendering markup pages and messages (e.g., HTTP, TCP/IP, SMS, MMS, IM, email, and/or other messages), audio, video, and enable telecommunication with another user of another client device. In addition, or alternatively, programs 244 may include one or more dedicated messaging applications for sending and receiving messages, such as SMS, MMS, IM, email, and/or other messages. Examples of other application programs include calendars, contact managers, task managers, transcoders, database programs, word processing programs, spreadsheet programs, games, and so forth.

Client device 200 also includes a power supply 226, one or more wireless interfaces 250, an audio interface 252, a display 254, a keypad 256, an illuminator 258, an optional data capture module 259, an input/output interface 260, an optional haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station, or directly with another client device. Wireless interface 250 includes circuitry for coupling client device 200 to one or more wireless networks, and is constructed for use with one or more communication protocols and technologies including, but not limited to, TCP/IP, UDP, GSM, UMTS, HSDPA, EV-DO, CDMA, TDMA, SMS, GPRS, WAP, UWB, WiFi, IEEE 802.16 (WiMax), and the like.

Audio interface 252 is arranged to produce and/or receive audio signals such as the sound of a human voice, music, and the like. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a client device. Display 254 may also include a touch sensitive screen arranged to receive input from an object such as a stylus or a digit from a human hand.

Keypad 256 may comprise any input device arranged to receive input from a user. For example, keypad 256 may include a keyboard, a mouse, a push button numeric dial, or the like. Keypad 256 may also include command buttons that are associated with selecting and performing changeable processes. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the mobile device to illuminate in response to actions. Illuminator 258 may further be used as a flash for image capture. An optional data capture module 259, such as a camera, may be included in client device 200. If the data capture module is included, the client device may obtain images, video, temperature, pressure, or other data.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, Zigbee™ and the like. Optional haptic interface 262 can sense input from a touch screen via finger tip, a graphics tablet via stylus, a joystick, or the like. Optional haptic interface 262 may also be arranged to provide tactile feedback to a user of the client device. For example, the haptic interface may be employed to vibrate client device 200 in a particular way when another user of a client device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), Enhanced Observed Time Difference (E-OTD), cell identifier (CI), service area identifier (SAI), enhanced timing advance (ETA), base station subsystem (BSS), or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances.

Illustrative Network Device

Figure 3:
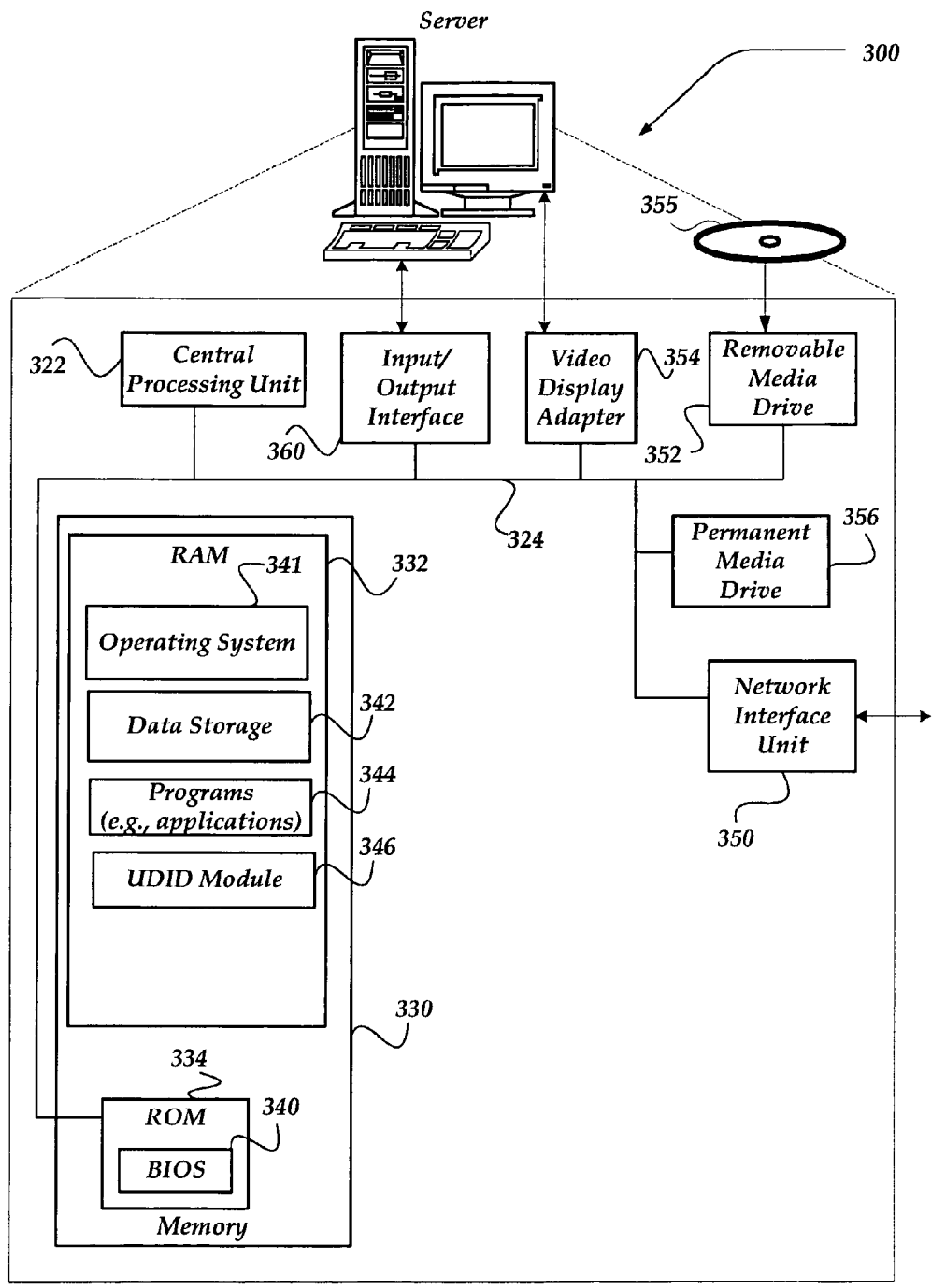
FIG. 3 illustrates a schematic diagram of one embodiment of an example network device.

FIG. 3 shows one embodiment of a network device, according to one embodiment of the invention. Network device 300 may include many more, or fewer, components than those shown. The components shown, however, are sufficient to disclose an illustrative embodiment for practicing the invention. Network device 300 may represent, for example, UDID server 106, applications server 108, or another client device of FIG. 1. For example purposes, network device 300 will be described as a server device that includes UDID server 106 and applications server 108.

As shown in the figure, server device 300 includes a processing unit 322 in communication with a mass memory 330 via a bus 324. Mass memory 330 generally includes a RAM 332, a ROM 334, and other storage means. Mass memory 330 illustrates a type of computer-readable media, namely computer storage media. Computer storage media may include volatile and nonvolatile, removable and non-removable media implemented in any method or technology for storage of information such as computer readable instructions, data structures, program modules or other data. Other examples of computer storage media include flash memory, EEPROM, or other semiconductor memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Mass memory 330 stores a basic input/output system ("BIOS") 340 for controlling low-level operation of server device 300. The mass memory also stores an operating system 341 for controlling the operation of server device 300. It will be appreciated that this component may include a general purpose operating system such as a version of Windows, UNIX, LINUX, Solaris, or the like. The operating system may also include, or interface with a Java virtual machine module that enables control of hardware components and/or operating system operations via Java application programs.

Mass memory 330 further includes one or more data storage units 342, which can be utilized by server device 300 to store, among other things, SDIDs, UDIDs, programs 344 and/or other data. Programs 344 may include computer executable instructions which can be executed by server device 300 to implement server-side applications, such as messaging applications, collaboration applications, or the like. Programs 344 may also include a markup handler application, such as a WAP handler application for transmitting, receiving, and otherwise processing WAP communications, an HTTP handler application for transmitting, receiving, and otherwise processing HTTP communications, and the like. Similarly, programs 344 can include a secure socket layer (SSL) handler application for handling secure connections, such as initiating communication with an external application in a secure fashion. Other examples of application programs include content management applications, schedulers, calendars, web services, transcoders, database programs, word processing programs, spreadsheet programs, and so forth. Accordingly, programs 344 can process images, audio, video, or markup pages, enable telecommunication with another user of another electronic device, and/or other services.

In addition, mass memory 330 stores a UDID module 346. UDID module 346 may include computer executable instructions, which may be run under control of operating system 341 to create, modify, provide, receive, and otherwise manage SDID data, UDID data, configuration data, or the like for a collection of client devices. In one embodiment, UDID module 346 generally communicates with a client device and application programs to associate a client device with a number of applications.

Server device 300 also includes an input/output interface 360 for communicating with input/output devices such as a keyboard, mouse, wheel, joy stick, rocker switches, keypad, printer, scanner, and/or other input devices not specifically shown in FIG. 3. A user of server device 300 can use input/output devices to interact with a user interface that may be separate or integrated with operating system 341, programs 344, and/or other modules. Interaction with the user interface includes visual interaction via a display, and a video display adapter 354.

Server device 300 may include a removable media drive 352 and/or a permanent media drive 356 for computer-readable storage media. Removable media drive 352 can comprise one or more of an optical disc drive, a floppy disk drive, and/or a tape drive. Permanent or removable storage media may include volatile, nonvolatile, removable, and non-removable media implemented in any method or technology for storage of information, such as computer readable instructions, data structures, program modules, or other data. Examples of computer storage media include a CD-ROM 355, digital versatile disks (DVD) or other optical storage, magnetic cassettes, magnetic tape, magnetic disk storage or other magnetic storage devices, RAM, ROM, EEPROM, flash memory or other memory technology, or any other medium which can be used to store the desired information and which can be accessed by a computing device.

Via a network communication interface unit 350, server device 300 can communicate with a wide area network such as the Internet, a local area network, a wired telephone network, a cellular telephone network, or some other communications network, such as network 105 in FIG. 1. Network communication interface unit 350 is sometimes known as a transceiver, transceiving device, network interface card (NIC), and the like.

Illustrative Architecture

Figure 4:
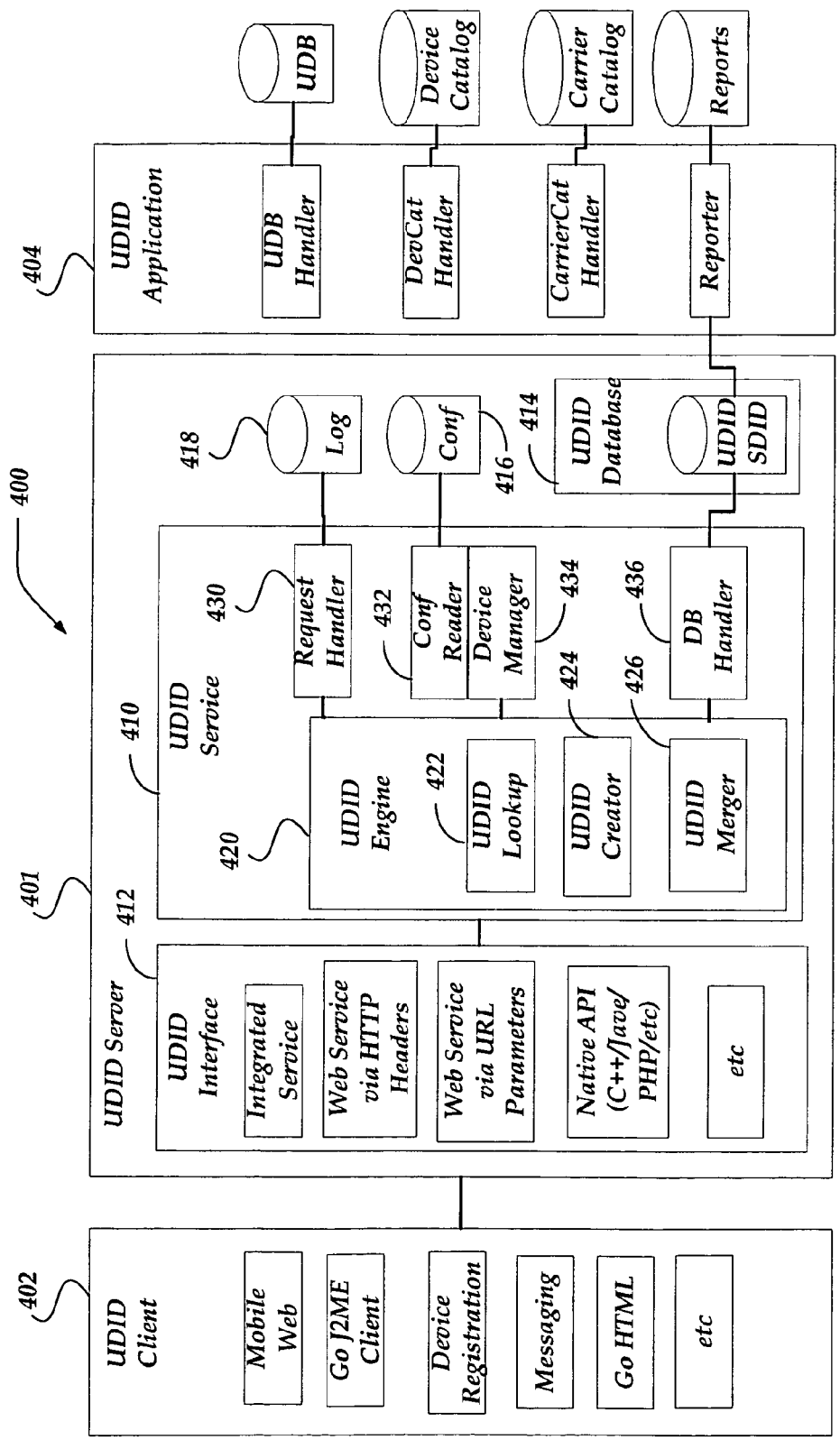
FIG. 4 illustrates a block diagram of one embodiment of an example architecture of a UDID system.

FIG. 4 illustrates a block diagram of one embodiment of an example architecture of a UDID system 400. In this embodiment, UDID system 400 generally comprises three parts; namely one or more UDID channel client front ends 402, one or more UDID servers 401, and one or more UDID applications 404.

A UDID channel client front end 402 includes one or more channel clients that communicate with client mobile devices, to route and otherwise manage various types of communication channels between the mobile devices and UDID server 401. Channel clients and/or client mobile device are sometimes referred to herein as UDID clients. In general, a UDID client can be a client in any mobile channel such as mobile web, native application, J2ME mobile clients, SMS/MMS messaging clients, mobile multimedia applications or other mobile clients. A UDID client generally uses UDID services to obtain a UDID. In this example embodiment, a UDID channel client requests a UDID for a mobile device, and a UDID application applies UDID knowledge to determine information related to the mobile device.

Thus, UDID server 401 also communicates with UDID application 404, which generally tracks and analyzes actions performed with mobile devices and other devices to determine user behaviors, relevant advertisements, or other information. UDID application 404 combines user IDs, bcookies, or other data with UDIDs to determine services, content, or information that may be relevant to identified mobile devices. In one embodiment, a UDID application applies UDID knowledge for business intelligence. One example is to report page views per UDID, according to access logs. Another example is to use a UDID to look up device information from a device catalog for an identified device. Yet another example is to use a UDID to look up network information from a carrier catalog for the identified device. A further example is to use a UDID to look up user information from a user database associated with the identified device. UDID application 404 may also provide online services such as email, SMS messaging, website content, user database services, or the like.

UDID server 401 generally determines a UDID for a client mobile device. In one embodiment, UDID server 401 also generally comprises three subparts; namely a UDID interface 412, a UDID service module 410, and one or more databases. Each subpart is sometimes referred to herein as a layer. The database layer generally stores and maintains SDID and UDID records, configuration information, and logs.

In this example embodiment, UDID interface 412 generally communicates with UDID channel client front end 402 to provide easy access to UDID service module 410 by all mobile channels, including mobile web (e.g., for oneSearch™, oneConnect™ and onePlace™), J2ME-based clients, SMS messaging, Ajax, Flickr™, Go-HTML, iPhone™ widgets, mobile widgets and other mobile channels. This interface layer provides well-defined services between channels clients of UDID channel client front end 402, and reduces UDID complexity from those channels. UDID interface 412 can also support an integrated service, and/or provide a web-based service. In at least one embodiment, UDID interface 412 publishes a set of APIs that can be called by channels of UDID channel client front end 402. A channel of the UDID channel client front end 402 uses the UDID interface layer to request UDID service, by passing requests that include one or more SDIDs. The requests from one or more channel clients to a server can be integrated. A request can also use a web service by passing parameters in HTTP headers or parameters in a URL. In addition, or alternatively, channel clients can request a UDID using a C++, or PHP, or Java, or other native API that is selectively supported by UDID service module 410. The UDID interface enables UDID service 410 to use open interfaces, normalized data, and a common process across all channels, such as mobile web, J2ME clients, various types of messaging, and the like.

UDID service module 410 generally manages identifiers, and determines a UDID for each mobile device. UDID service module 410 is sometimes referred to herein as the service layer. UDID service module 410 is in communication with UDID interface 412 to receive requests from mobile devices. Based on SDIDs and/or a UDID in each request, UDID service module 410 creates, finds, or selects interim UDIDs until determining a final UDID. Throughout these processes, the UDID service module determines updated SDIDs and/or UDIDs as needed. UDID service module 410 is also in communication with the one or more databases that store logs, configuration information, and identifiers.

UDID service module 410 includes a UDID engine 420 to create, search, and merge UDIDs. UDID engine 420 is in communication with a request handler 430 to process incoming communication requests from client devices through other components of UDID server 401. Request handler 430 also performs security checking and handles error conditions. Request handler 430 returns a response with a UDID if one was obtained. Request handler 430 also logs requests in a log data store 418.

UDID engine 420 is also in communication with a configuration reader 432 that manages configuration data. Configuration reader 432 is in communication with a configuration data store 416 that stores configuration settings. In this example embodiment, two types of settings are stored. One type of setting is related to UDID services. For instance, a UDID services setting can be a flag, indicating whether to enable or disable UDID services. Another UDID services setting may be a parameter to control a debug level. The other type of setting is related to SDIDs. For instance, an SDID setting can define which SDIDs are acceptable. The SDID settings can also indicate a weight for each acceptable SDID.

The configuration reader may include, or may communicate with a device manager 434 to manage configuration data, validate SDIDs received in requests, apply weights to SDIDs, and manage other operations. Validating SDIDs may comprise checking the configuration settings to determine whether the system administrator allowed a type of SDID in an incoming request to be used for obtaining a UDID. If allowed, the device manager may obtain the weight assigned by the administrator to the type of SDID received in the request. The SDID weight is valuable in UDID merging, because this setting is used to determine which UDID associated with multiple SDIDs becomes the final UDID. As discussed above, several individual UDIDs may be associated with corresponding SDIDs for a device, until a final UDID is selected. Weighting each SDID provides configurable control over UDID selection, such as for premium services, preferred services, or the like.

However, the combination of using a predefined weighting and making this weighting configurable to control updates to the database records is not intuitive from conventional processing. Nevertheless, any criteria can be used to define the weighting, so that the database is updated according to the criteria. For example the UDID system may automatically select a UDID that is associated with a type of SDID that is received most frequently, a UDID that is indicated during a user registration of a mobile device, a UDID that is first in the database, or a UDID that is based on other usage criteria. Alternatively, a weight for each SDID may be hard-coded, and the same set of weighted SDIDs would be applied to all implementations. Any change to weights or use of a subset of SDIDs would require a change to program code, which may or may not desirable, depending on security criteria.

In addition, or alternatively, SDID weights may be pre-defined by a UDID system administrator. Pre-defined SDID weights may always be applied, or may be set to override an automatically determined UDID if a pre-defined event occurs. The UDID system may also enable the administrator to selectively prioritize the usage criteria based on the weights. An adjustable weight for each SDID also allows a system administrator to selectively evolve UDID determination without code changes, as time goes by. The administrator can grow or shrink the list of qualified SDIDs. The administrator can vary the weight for each SDID from time to time. The administrator can change the criteria to determine an SDID weight. For instance, the administrator may selectively decide weights based upon a subjective criterion of application popularity. In the past, perhaps J2ME applications were popular and corresponding SDIDs (e.g., client IDs) had the highest weight. At another time, the administrator may determine that mobile web applications have grown popular, and may selectively change the SDID weights so that MIN has the highest weight. At another time, the administrator may determine that Apple widgets are the most popular applications, and modify the predefined weights so that SDIDs for Apple widgets become the most important SDID. The above determinations can also be performed automatically.

UDID engine 420 is further in communication with a database handler 436, which interfaces with a UDID database 414 to store, maintain, and otherwise manage SDID and UDID records. Database handler 436 also checks for database errors and handles error conditions, to return SDID and UDID records to consistent states.

Creation, search, and merging of UDIDs are performed by components of UDID engine 420, which include a UDID creator 424, a UDID lookup component 422, and a UDID merger 426. If a client application on a mobile device sends a request to a server application, and the request includes an SDID that has not yet been detected, the UDID creator 424 creates a new UDID and associates it with the newly received SDID. This may be the case when a new mobile device executes a client application for the first time, executes a new browser session with a new bcookie, or other first-time operation. As discussed above, a created UDID is unique. In one embodiment, the UDID is also digitally signed for authentication. A version number may also be applied for traceability.

A new UDID is created only once when a device sends a request with a new SDID for the first time. The newly created UDID is stored together with the received SDID in UDID database 414 for future retrieval. A timestamp of the UDID creation and a UDID client ID may also be stored in SDID and UDID records.

Once a UDID is stored with an SDID, subsequent requests with the SDID are quickly used to lookup the corresponding UDID. UDID lookup module 422 performs this lookup. To determine whether a UDID is already associated with incoming SDIDs, UDID lookup module 422 checks each SDID in every request that is received. If one valid UDID is already associated with the received SDID, the detected UDID is returned to the client mobile device as the response to the UDID request. However, hundreds, thousands, or millions of requests may come from each of millions of mobile devices. Thus, some embodiments are configured to provide real time responses to each of these millions of requests. Sometimes many UDID requests are related to the same device via one SDID. Therefore, in most cases, UDID lookup module 422 causes database handler 436 to perform a single database read and discover the UDID for each request.

However, at other times, requests will include multiple SDIDs. For example, a multi-service provider, such as a web portal, may store a cookie jar on a mobile device to hold multiple cookies for the multiple services. For instance, the multi-service provider may store a bcookie on the mobile device with a browser SDID that identifies the mobile device browser. The multi-service provider may also store another cookie with an email service SDID that identifies the email user ID. If that same device later accesses a weather webpage through the same multi-service provider, the multi-service provider may cause another cookie with a weather webpage SDID to be added to the same cookie jar. The cookie jar may later be accessed to create another UDID request, and all three SDIDs will be inserted into the request.

If multiple SDIDs are in one incoming request, this implies that these SDIDs are associated with the same device. UDID lookup module 422 may check the configuration data to determine which SDID has the highest weight. The UDID lookup module can then instruct the database handler to perform one read access for the SDID record with the highest weighted SDID. If this SDID record identifies a UDID, the UDID lookup module may return the identified UDID. This single database lookup is a large majority of the cases for a device with multiple SDIDs.

If this SDID does not identify a UDID, a new UDID may be created by UDID creator 424. In addition, or alternatively, UDID lookup module 422 can simply use another one of the SDID from the received request to determine whether it is associated with a UDID. This process can continue until all SDIDs from the request are checked.

In another embodiment, the UDID lookup module checks whether an identified UDID is the only possible UDID. If an active UDID is detected for one of the SDIDs in the request, the UDID lookup module 422 also checks the accessed SDID database record to determine whether each SDID in the record matches each SDID in the received request. If SDIDs in the received request match the SDIDs in the accessed record, the corresponding UDID that was retrieved from the SDID record is valid UDID for this request.

If the UDID lookup module detects multiple UDIDs, based on the multiple SDIDs, one embodiment does not simply select the UDID corresponding to the highest weighted SDID. Instead, the UDID lookup module 422 passes control to a UDID merger 426 to select one of the UDIDs, or otherwise merge the multiple UDIDs. UDID merge generally occurs only when multiple SDID are received for the first time. This first time is a rare occurrence, compared to hundreds or millions of requests with the same set of SDIDs from this device.

As discussed above, the final UDID may be determined based on pre-defined weights of the SDIDs. In one embodiment, the UDID merger 426 accesses each UDID record for each separate SDID in the request. For example, each SDID may be associated with a different set of records, such as those shown in Table 2. Each set of records would have one UDID record. Thus, there would be at least two UDID records. Each UDID record may have a different set of associated SDIDs. Because each SDID is pre-assigned a weight, the highest weighted SDID in one UDID record, may be different from the highest weighted SDID in another UDID record. In one embodiment, the UDID merger 426 applies to each independent UDID, the weight of its corresponding highest weighted SDID. The UDID merger 426 then selects the UDID associated with the highest weighted SDID as the final UDID.

Subsequently, the UDID merger 426 updates each SDID record to list the selected final UDID. Similarly, the UDID merger 426 updates the selected UDID record to include the corresponding SDID from the request that was not previously included in the selected UDID record. The UDID merger 426 deletes the non-selected UDID record, or otherwise marks the non-selected UDID record as obsolete. The database handler 436 then writes the updates to UDID database 414.

Database handler 436 and UDID database 414 are sometimes referred to herein as the database layer. In one embodiment, the database structure is configured to provide fast response time. As discussed above, fast access is desired for high volumes of requests, such as hundreds of requests per second. The high volume also suggests that a large amount of data must be stored, and must be maintained accurately. Thus, it would be logical to us a relational database to reduce duplicate data and reduce complexity for database updates, thereby increasing database processing speed. But contrary to this logical approach, an embodiment of the invention uses an alternate database structure that stores more duplicate data to reduce the number of read operations to a single database read for most cases. This makes the data structure faster than a relational database. The data structure also provides real time SDID merge to eliminate off-line merge for SDIDs.

Specifically, as introduced above, an embodiment of the invention uses a file system based lookup database with a schema and specific access process to achieve efficient database access for UDID lookup. As illustrated above in Table 2, a sample schema is defined so that all SDIDs and UDID are keys to their records. Non-key SDIDs and UDID are fields in each record. This schema enables access to all SDIDs and UDID with a single read access to the database. In one embodiment, a single database read is performed for the highest weighted SDID in a request. If a UDID exists for this highest weighted SDID, and the existing UDID record includes all SDIDs in the request (the UDID is valid), the single database read minimizes database response time. With a large volume of requests, the single database read reduces overall database processing time. Details in another example embodiment are described below with regard to flow diagrams of FIGS. 5-9.

Figure 5:
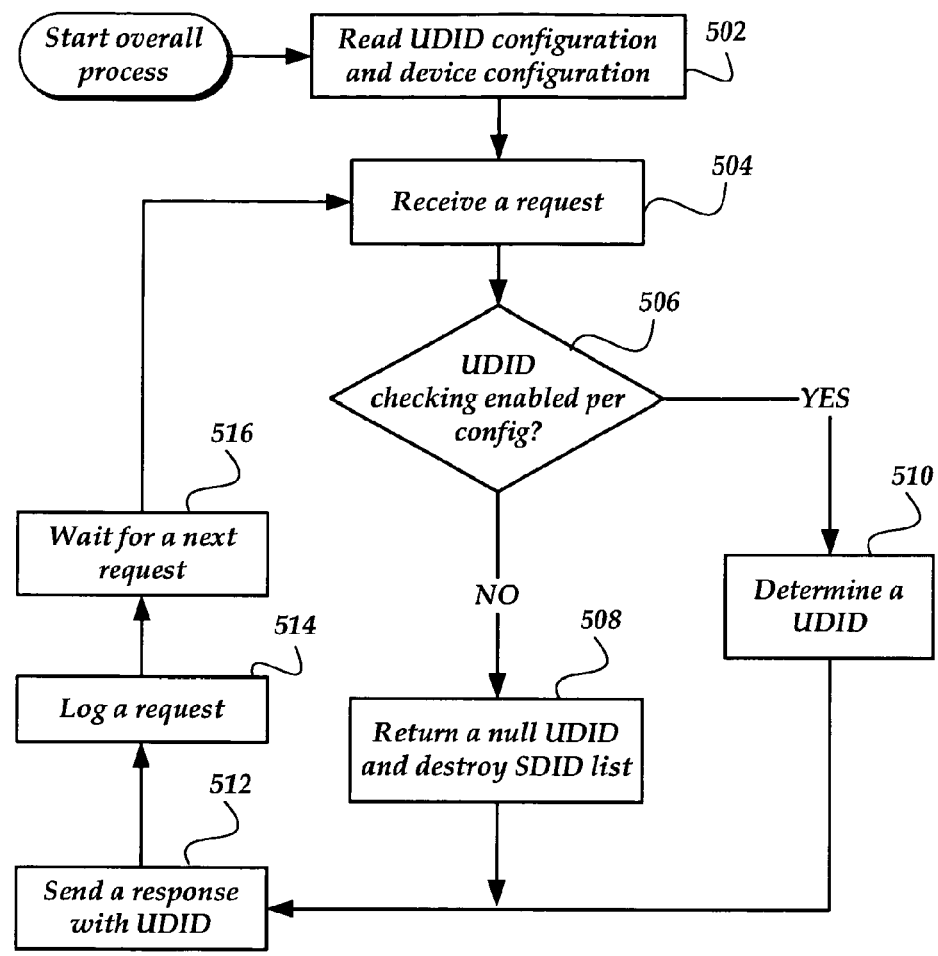
FIG. 5 illustrates a flow chart of example logic for an overall process according to one embodiment.

FIG. 5 illustrates a flow chart of example logic for an overall process according to one embodiment. At an initialization operation 502, the UDID server reads weights and other configuration information. For example, a system administrator may specify which SDIDs are supported. Each supported SDID may be assigned a weight, indicating the importance of each client application, online service, communication channel, or other service. As described above, when a UDID merge occurs, the SDID with the higher weight may be given precedence, such that the UDID associated with the higher-weighed SDID would be chosen for the merge.

At an operation 504, the UDID server receives a request that includes an SDID and/or a UDID. The request may indicate that a client application desires content or services from a portal or other or server application. At a decision operation 506, the UDID server determines whether the overall function of checking for UDIDs is currently enabled. For example, the configuration data may indicate whether the UDID service is currently available. If the UDID service is not currently available, the UDID server returns a null value for the UDID at an operation 508. The UDID server may also destroy any current SDID list. However, if the UDID service is currently enabled, the UDID server determines a UDID at an operation 510. In either case, the UDID server sends a response with a UDID value, at an operation 512. Subsequently, the UDID server logs the request at an operation 514. The UDID server then waits for a next request at an operation 516. When another request is received, control returns to operation 504 to repeat the process.

Figure 6:
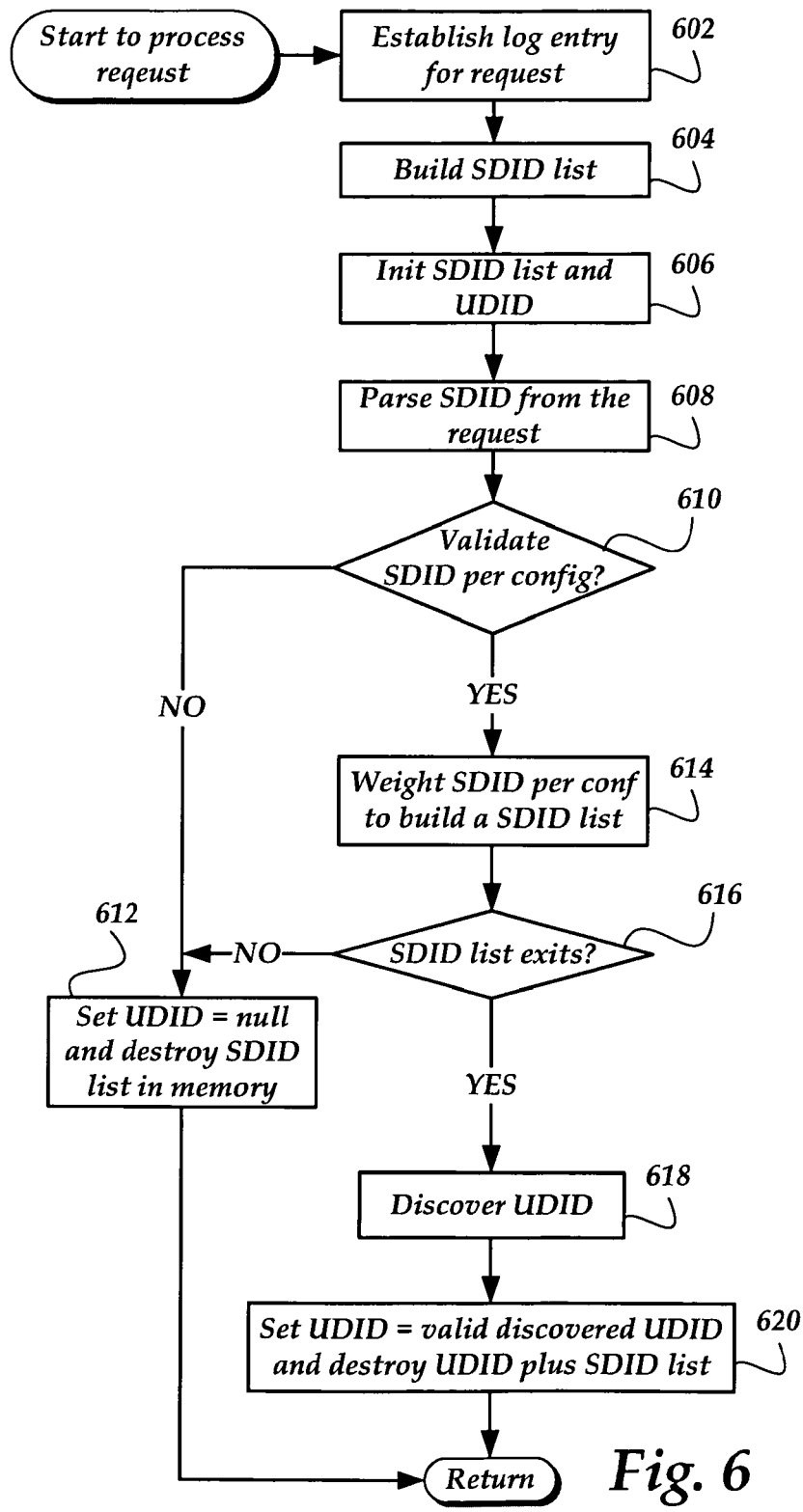
FIG. 6 illustrates a flow chart of example logic for a request handling process according to one embodiment.

FIG. 6 illustrates a flow chart of example logic for a request handling process according to one embodiment. At an operation 602, the request handler of the UDID service establishes a log entry for the currently received request. At an operation 604, the request handler builds an SDID list that will be populated based on the request. The request handler initializes the SDID list, at an operation 606. The request handler also initializes a UDID. At an operation 608, the request handler parses the request for one or more SDIDs that were included in the request.

At a decision operations 610, the request handler determines whether an SDID (or UDID) is included in the request, and whether the included SDID is a valid SDID, according to the current configuration data. In one embodiment, an SDID that is included in a request may be considered valid, if the configuration data indicates that the included SDID is an SDID that was pre-selected by the system administrator. For example, the system administrator may indicate in the configuration data that the UDID service should evaluate requests that include MINs and bcookies, but should not evaluate requests that include client IDs. If the request handler determines that the request does not include a valid SDID, the UDID service sets the UDID to a null value, and destroys the corresponding SDID list, at an operation 612.

If a valid SDID is included in the request, the UDID service applies a weight to the received SDID, according to the configuration data, at an operation 614. This updates the SDID list with the weight information. At a decision operation 616, the UDID service determines whether a record exists in the database for the received SDID. If a record does not exist, the UDID service sets the UDID to a null value, and destroys the current SDID list, at operation 612. If a record does exist, the UDID service invokes the UDID look up module, at an operation 618, to discover the corresponding UDID. Details of this look a process are described below with regard to FIG. 7. If a UDID value is discovered, the UDID service sets the UDID to a valid discovered UDID value, at an operation 620. The UDID service also destroys any unselected UDID, if multiple UDIDs were discovered. In addition, the UDID service destroys the current SDID list. The UDID service then waits to process another request.

Figure 7:
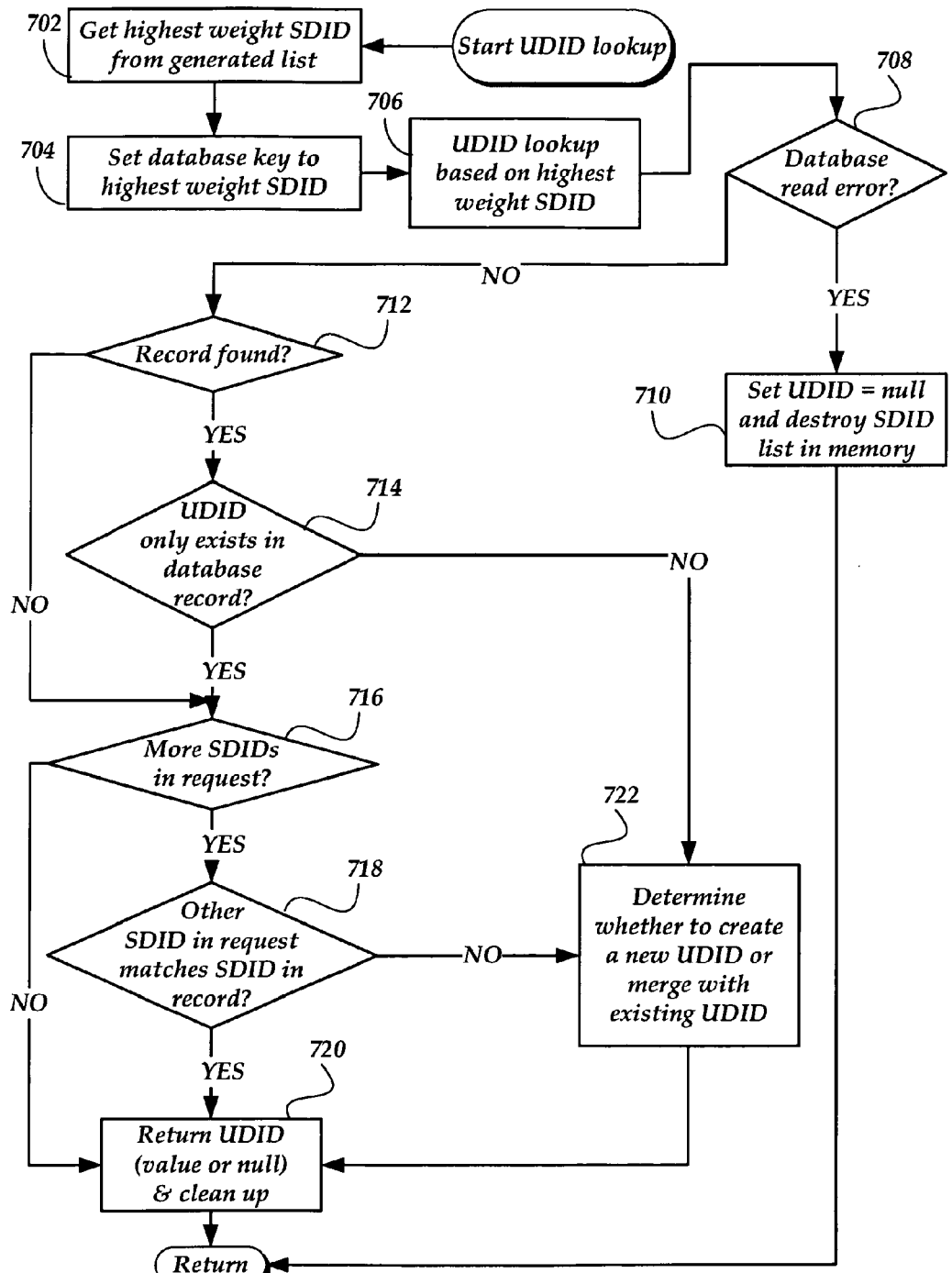
FIG. 7 illustrates a flow chart of example logic for a lookup process according to one embodiment.

FIG. 7 illustrates a flow chart of example logic for a lookup process according to one embodiment. At an operation 702, the UDID lookup module evaluates the generated list to determine the highest weighted SDID that was received in the request. The UDID lookup module then sets a database key to the highest weighted SDID that was determined from the generated list, at an operation 704. At an operation 706, the UDID lookup module instructs the database handler to perform a search of the UDID database, based on the highest weighted SDID. At a decision operation 708, the database handler determines whether or a database error occurred during the lookup process. If a database error occurred, the UDID lookup module sets the current UDID to a null value, and destroys the current SDID list, at an operation 710. Control then returns to the UDID service module to await another request.

The UDID lookup module determines, at a decision operation 712, whether a record was found in the database, based on the highest weighted SDID from the generated list. If a record was found, the UDID lookup module determines, at a decision operation 714, whether the database record includes only a UDID. If the found record includes only a UDID, or if no record was found based on the highest weighted SDID, the UDID lookup module determines, at an operation 716, whether any additional SDIDs were included in the request. If another SDID was included in the request, the UDID lookup module then determines, at a decision operation 718, whether another SDID from the request matches an SDID that was found in the record. If a matching SDID is found, or if no other SDIDs were included in the request, the UDID lookup module returns a UDID value that was found associated with a matching SDID, at an operation 720. Alternatively, the UDID lookup module returns a null value if no UDID was found associated with a matching SDID. The UDID lookup module then performs a cleanup operation to remove unused data, and control returns to await another request.

If decision operation 714 determines that the retrieved record does not include a UDID, or include multiple UDIDs, or if decision operation 718 determines that no other SDID in the request matches an SDID in the retrieved record, the UDID service determines whether to create a new UDID or merge multiple UDIDs (e.g., select one of the multiple UDIDs), at an operation 722. Details of operation 722 are described below with regard to FIG. 8. After a new UDID is created, or multiple UDIDs are merged, the UDID lookup module returns a new UDID or merged UDID at operation 720. Control then returns to await another request.

Figure 8:
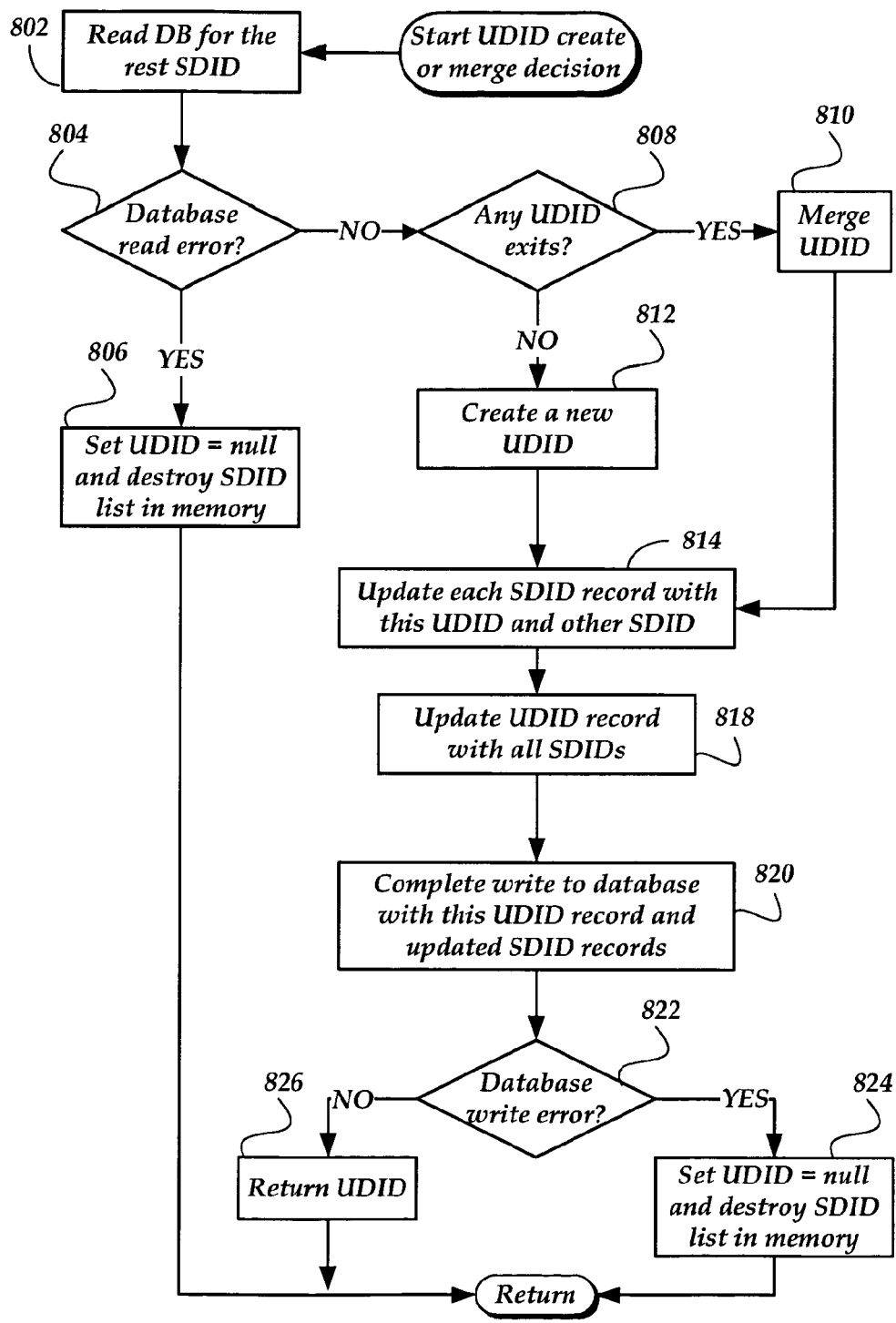
FIG. 8 illustrates a flow chart of example logic for a UDID creation or merge determination process according to one embodiment.

FIG. 8 illustrates a flow chart of example logic for a UDID creation or merge determination process according to one embodiment. At an operation 802, the database handler reads the database for other SDIDs that are associated with the other SDID received in the request. At a decision operation 804, the database handler determines whether a database error occurred during the read operation. If an error occurred, the UDID lookup module sets the UDID to a null value, and destroys the current SDID list, at an operation 806. Control then returns to await another request.

If a database error did not occur, the UDID lookup module determines, at a decision operation and 808, whether a UDID is associated with the other SDID received in the request. If such a UDID exists, the UDID lookup module passes control to the UDID merger module to merge multiple UDIDs, at an operation 810. However, if a UDID is not associated with the other SDID from the request, the UDID lookup module passes controlled to the UDID creator module to create a new UDID, at an operation 812.

After a new UDID is created or multiple UDIDs are merged, the UDID engine updates a working copy of the SDID records and UDID records in memory. In one embodiment, the memory records may be updated in any order, because the memory records can be discarded if a memory error occurs, and the prior stored database records can be used again. However, if a write error were to occur while writing updated records to the database disk, the order of writing the updated records has more effect on the efficient processing of future requests. For consistency, one embodiment updates the memory records in the same order as database write operations.

In this example embodiment, at an operation 816, the UDID engine updates any obsolete (e.g., non-selected) UDID record(s). For example, if a merge was performed, the non-selected UDID would be considered obsolete. However, the UDID engine updates the SDID/UDID associations in the memory copy of the obsolete UDID record, to prevent a redundant merge operation in the future. The UDID engine also updates the memory copy of each SDID record with the newly created or merged UDID and the other SDID that was received in the request. To match the database writing operations, the SDID records are updated according to their corresponding weight. In one embodiment, the SDID record that corresponds to the lowest weighted SDID is the first SDID record that is updated. The SDID record that corresponds to the next higher weighted SDID is the next SDID record that is updated. This proceeds up to the SDID record that corresponds to the second higher weighted SDID. The last SDID record update can be applied to the SDID record that corresponds to the highest weighted SDID. However, in one embodiment, it is beneficial to update the memory copy of the UDID record for the newly created or merged UDID, before updating the final SDID record that corresponds to the highest weighted SDID. This gives a final opportunity to recover from an error before updating the SDID record that is most likely to be accessed in response to another request.

In either order, the UDID engine updates the memory copy of the UDID record for the newly created or merged UDID, at an operation 818. This update includes associating the newly created or merged UDID with all of the corresponding SDIDs in the UDID record for the newly created or emerged UDID.

As indicated above, the memory records may be updated in a different order without as much impact on request processing. If an error occurs during any of the memory updates, the UDID engine can simply discard the memory records and use the prior records stored in the UDID database. But if an error occurs during the process of writing the updated records to the database disk, the records will be inconsistent. Some stored database records would have the updated SDID/UDID association, and some stored database records would have the old SDID/UDID association. To ensure that the UDID lookup process will continue to operate after such a database error, the database handler writes instructs the UDID database to update the disk records in the order described above, at an operation 820.

The weighting of the SDIDs described above can also affect the number of records that must be updated and written to the database disk. Below are examples that illustrate the affect of weights on the number and ordering of database updates.

1) One Existing UDID

In one example, two SDIDs are received in a single incoming request. The two SDIDs may be labeled "SDID1" and "SDID2." In this simple example, SDID1 is already associated with a "UDID1." We also assume that the database record for UDID1 has a field for SDID1, and that the SDID1 field is the highest weighted (e.g., top) field in the UDID1 record. We further assume that SDID1 has a higher predefined weight than SDID2. In this example, SDID2 is not associated with any UDID at this point. Accordingly, the SDID2 record would not have any value in the UDID field of the SDID2 record (or may not have any UDID field in the SDID2 record).

Upon receiving the request, the UDID system accesses the SDID1 record and reads UDID1. Since SDID2 is also in the received request, the UDID system presumes that SDID1 and SDID2 are related. Accordingly, the UDID system reads the SDID2 record, but notes that the SDID2 record does not have a UDID. Consequently, the UDID system performs a merge operation that results in UDID1 becoming the final UDID for both SDID1 and SDID2. As a result, SDID2 is inserted into another field of the SDID1 record. Similarly, SDID1 is inserted into the SDID2 record. Because the SDID2 record did not previously have a UDID field value, the merge causes UDID1 to be inserted into the UDID field of the SDID2 record. Also, the UDID1 record is updated to add SDID2 to another field.

Based on the above merge, the UDID system first writes an updated SDID2 record, because SDID2 has a lower weight than SDID 1. The UDID system then writes the updated UDID1 record to the database, because it is less likely to be accessed than the highest weighted SDID1 record. Finally, the UDID system writes an updated SDID1 record to the database. Thus, three records are written to the database disk.

In response to the received request, UDID1 is returned to the mobile device. Subsequently, the UDID system will know that requests including either SDID1 or SDID2 are from the same mobile device.

2) Two Existing UDIDs

For comparison, another example also has two SDIDs received in a single incoming request. But in this example, SDID1 is associated with UDID1 and SDID2 is already associated with UDID2. Again we assume that the database record for UDID1 has a field for SDID1, and that the SDID1 field is the highest weighted (e.g., top) field in the UDID1 record. Similarly, we assume that the database record for UDID2 has a field for SDID2, and that the SDID2 field is the highest weighted (e.g., top) field in the UDID2 record. Again we assume that SDID1 has a higher predefined weight than SDID2.

In this example, the UDID system merges the two UDIDs by selecting UDID1, because UDID1 is associated with the higher weighted SDID1. Thus, UDID1 becomes the final UDID for both the SDID1 record and the SDID2 record. To update the records, the UDID system marks the UDID2 record as obsolete. In one embodiment, the UDID system also updates the UDID2 record to specify UDID1 in the UDID field of the UDID2 record. The UDID system then inserts the higher weighted SDID1 into the lower weighted SDID2 record. In the SDID2 record, the UDID system also replaces the UDID2 value in the UDID field, with the UDID1 value. In general, the lower weighted SDID2 record is updated before the higher weighted SDID1 record, so that if a database write error occurs during the write process, the UDID system can recover from the error with the higher weighted SDID1 record which still has the prior information.

The UDID system next updates the UDID1 record by inserting the lower weighted SDID2 into another SDID field of the UDID1 record. Similarly, the UDID system then inserts the lower weighted SDID2 into the higher weighted SDID1 record. Based on this merge process, four write operations are used to write the updated records UDID2, SDID2, UDID1, and SDID1. In response to the received request, UDID1 is returned to the mobile device. Subsequently, the UDID system will know that requests including either SDID1 or SDID2 are from the same mobile device based on the same UDID1.

3) Two Existing UDIDs

In a further example, the UDID system receives a single request, but the request has two different SDIDs. For example, the received request may include SDID3 and SDID4. In this example, SDID3 is already associated with UDID2 and SDID4 is already associated with UDID1. Here we assume that the database record for UDID1 has a field for SDID4, but that the SDID1 field is the highest weighted (e.g., top) field in the UDID1 record. Similarly, we assume that the database record for UDID2 has a field for SDID3, but that the SDID2 field is the highest weighted (e.g., top) field in the UDID2 record. Again we assume that SDID1 has a higher predefined weight than SDID2. We also assume that both SDID1 and SDID2 have higher weights than SDID3 and SDID4. For completeness, we assume that SDID3 has a higher weight than SDID4.

When the UDID system receives the request from the mobile device, the UDID system accesses the SDID3 record and the SDID4 record. These records identify UDID2 and UDID1, respectively, but one should be selected to represent the mobile device. The UDID1 record includes fields for SDID4 and for SDID1. Similarly, the UDID2 record includes fields for SDID3 and SDID2. Even though SDID3 has a higher weight than SDID4, UDID2 is not selected. Instead, UDID1 is selected, because SDID1 has the highest weight of the SDIDs. Thus, UDID1 is the final UDID.

The UDID system then updates the records in the order as described above. The UDID system updates the non-selected UDID2 record to specify UDID1 in the UDID field. Thus, even if a request is received with UDID2 in the request, the UDID system will return UDID1 in the response. The UDID system then updates the lower weighted SDID records (e.g., SDID4 record, SDID3 record, and then SDID2 record). More specifically, the UDID system inserts SDID3, SDID2, SDID1, and UDID1 into the corresponding fields of the SDID4 record. Similarly, UDID system inserts SDID4, SDID2, SDID1, and UDID1 into the corresponding fields of the SDID3 record. The SDID2 record is revised by the UDID system to insert SDID1, SDID4, and UDID1 into the corresponding fields of the SDID2 record. Subsequently, the UDID system updates the UDID1 record with the SDID2, SDID3, and SDID4 values. The SDID1 record is revised by the UDID system to insert SDID2, SDID3, and UDID1 into the corresponding fields of the SDID1 record.

Based on this merge process, six write operations are used to write the updated records UDID2, SDID4, SDID3, SDID2, UDID1, and SDID1. In response to the received request, UDID1 is returned to the mobile device.

At any time during a database update process, at a decision operation 822, the database handler detects or determines whether a database write error occurred while writing any of the updated records to disk. If a database write error occurred, the database handler informs the UDID lookup module of the write error, and the database handle sets the newly created or merged UDID to a null value, and destroys the corresponding SDID list from memory, at an operation 824. Alternatively, if a database error did not occur, the database handler returns the newly created or merged UDID to the UDID lookup module, at an operation 826. The UDID lookup module then returns the UDID value in a response to the request.

Figure 9:
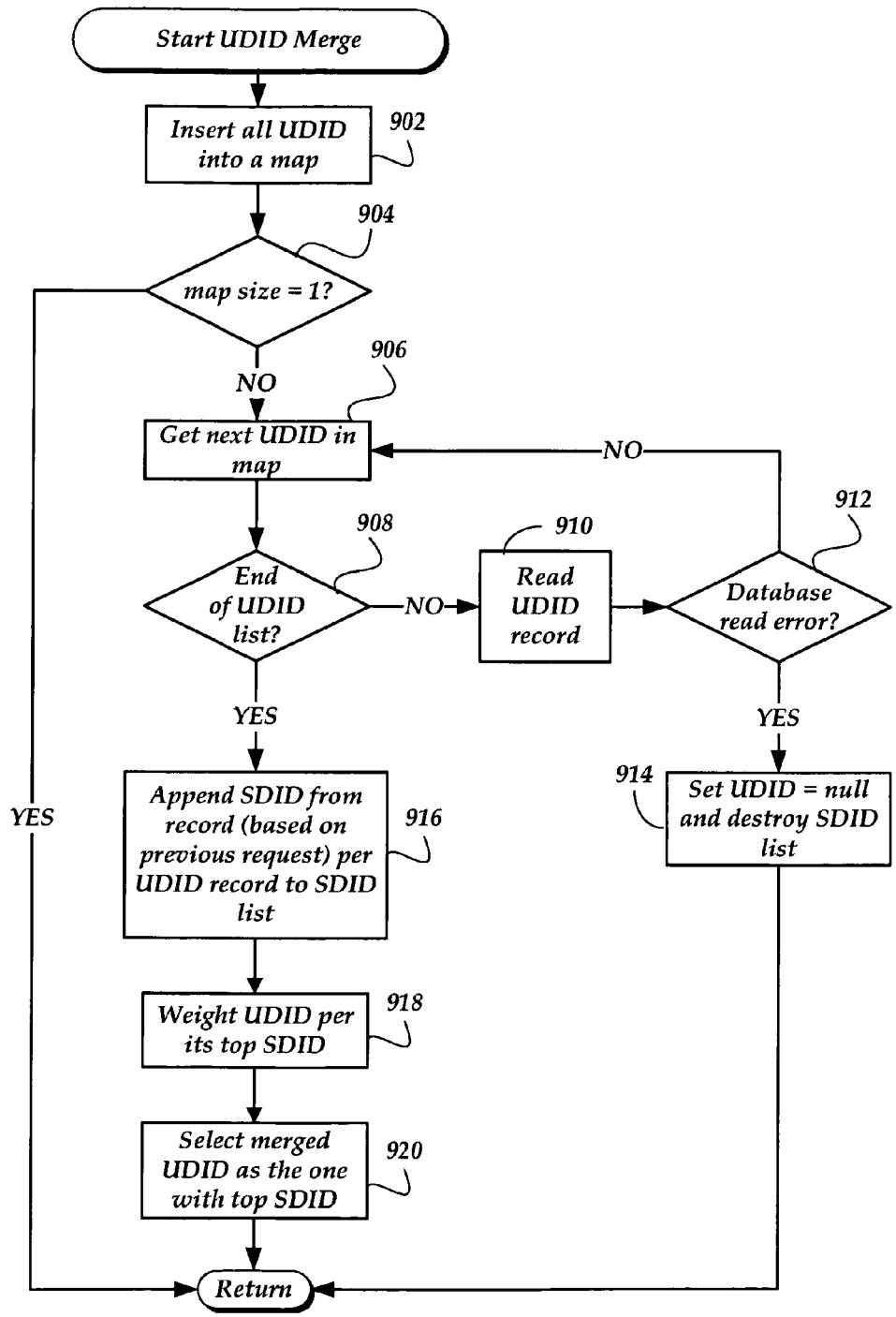
FIG. 9 illustrates a flow chart of example logic for a merge process according to one embodiment.

FIG. 9 illustrates a flow chart of example logic for a merge process according to one embodiment. At an operation 902, the UDID merger module inserts the multiple UDIDs into a map (list). At a decision operation 904, the UDID merger determines whether the map size is limited to one. If the map size is one, no merge is required, so control returns to the UDID lookup module to continue processing. However, if the map size is not equal to one, the UDID merger obtains a UDID from the map, at an operation 906. At a decision operation 908, the UDID merger determines whether it has reached an end of the list of multiple UDIDs. If the UDID merger has not reached the end of the list, the UDID merger instructs the database handler to read a corresponding UDID record from the database, at an operation 910. At a decision operation 912, the database handler determines whether a database read error occurred. If a database read error occurred, the database handler informs the UDID merger of the error, and the UDID merger aborts the merge, by setting the output UDID to a null value, and by destroying the corresponding SDID list, at an operation 914.

However, if a database read error did not occur, the UDID merger obtains a next UDID from the map, at operation 906. When the UDID merger has reached the end of the list, the UDID merger moves to an operation 916, at which the UDID merger appends to an SDID list, a corresponding SDID obtained from the record based on the that previous request, per the UDID record. At an operation 918, the UDID merger applies a weight to each UDID, where each weight corresponds to the weight of the highest weighted SDID for each corresponding UDID. At an operation 920, the UDID merger selects the UDID that has the highest weight. The UDID merger then returns the selected UDID, which is then sent to the client in a response to the request.

The above specification, examples, and data provide a complete description of the manufacture and use of the composition of the invention. But many modifications may be made without departing from the spirit and scope of the invention. For example, the UDID lookup can use an in-memory database to enhance performance. The UDID merge can be processed offline to provide database consistency. The UDID can be used to look up service information such as the carrier. Similarly, the UDID can be used to lookup device information such as device type, to lookup user information, or to lookup other information that can be associated with the UDID. A UDID can be used for any device, including a TV set, digital camera, iPod, game box, or other devices that use multiple services. Since many embodiments of the invention can be made without departing from the spirit and scope of the invention, the invention resides in the claims hereinafter appended.

What is claimed as new and desired to be protected by Letters Patent is:

1. A computer implemented method, comprising:
  receiving at a processor for a client device, a plurality of service-dependent identifiers (SDIDs) that each identify a service utilized by the client device;
  for each of the plurality of SDIDs, identifying an associated SDID record;
  identifying at least one universal device identifier (UDID) record and associated UDID using the received plurality of SDID records, the at least one UDID record identifies at least one other SDID beyond the plurality of SDIDs;
  determining a weighted ordering of each of the plurality of SDIDs and the at least one other SDID identified within the at least one UDID record;
  employing the weighted ordering to select one SDID;
  using the selected one SDID to determine a final UDID from the at least one UDID record to identify the client device; and performing one of the following actions selected from a group of actions comprising:
    using the weighted ordering of each of the plurality of SDIDs to update each of the plurality of SDID records to refer to the final UDID, modifying each of the plurality of SDID records to delete any references to a UDID other than the final UDID, marking as obsolete any UDID record associated with the client device other than a UDID record associated with the final UDID, updating each of the plurality of SDIDs records and a SDID record for the other SDID to include a cross-reference to each of the plurality SDIDs in the plurality of SDIDs and the other SDID, and modifying the at least one UDID record to specify the final UDID.

2. The computer implemented method of claim 1, further comprising providing the final UDID to the client device.

3. A network device, comprising:

memory configured to store service-dependent identifier (SDID) records and universal device identifier (UDID) records; and a processor that is configured to execute computer instructions and perform actions, including:

receiving for a client device, a plurality of service-dependent identifiers (SDIDs) that each identify a service utilized by the client device;

for each of the plurality of SDIDs, identifying an associated SDID record;

identifying at least one universal device identifier (UDID) record and associated UDID using the received plurality of SDID records, the at least one UDID record identifies at least one other SDID in addition to the plurality of SDIDs;

determining a weighted ordering of each of the plurality of SDIDs and the additional at least one other SDID;

employing the weighted ordering to select one SDID;

using the selected one SDID to determine a final UDID from the at least one UDID record to identify the client device; and performing one of the following actions selected from a group of actions comprising:

using the weighted ordering of each of the plurality of SDIDs to update each of the plurality of SDID records including SDID records associated with the at least one other SDID to refer to the final UDID, modifying each of the plurality of SDID records including SDID records associated with the at least one other SDID to delete any references to a UDID other than the final UDID, performing the modification of each SDID record based on the weighted ordering of the SDIDs, marking as obsolete any UDID associated with the client device other than the final UDID, and modifying each of the plurality of SDID records including SDID records associated with the at least one other SDID to include a cross-reference to each SDID in the plurality of SDIDs and the at least one other SDID.

4. The network device of claim 3, wherein the actions further include providing the final UDID to the client device.

5. A system, comprising:

storage device configured to store service-dependent identifier (SDID) records and universal device identifier (UDID) records;

and one or more network devices, each having a UDID interface and a UDID engine that executes instructions that perform actions, including:

receiving for a client device, a plurality of service-dependent identifiers (SDIDs) that each identify a service utilized by the client device; for each of the plurality of SDIDs, identifying an associated SDID record;

identifying at least one universal device identifier (UDID) record and associated UDID using the received plurality of SDID records, the at least one UDID record identifies at least one other SDID beyond the plurality of SDIDs;

determining a weighted ordering of each of the plurality of SDIDs and the at least one other SDID identified within the at least one UDID record;

employing the weighted ordering to select one SDID; and using the selected one SDID to determine a final UDID from the at least one UDID record to identify the client device; and performing one of the following actions selected from a group of actions comprising:

modifying each of the plurality of SDID records and a SDID records associated with the at least one other SDID, and the at least one UDID record with at least information about the final UDID, modifying each of the plurality of SDID records and a SDID records associated with the at least one other SDID to delete any references to a UDID other than the final UDID, marking as obsolete any UDID record associated with the client device other than a UDID record associated with the final UDID, performing the modification of each SDID record based on the weighted ordering of the SDIDs to modify records starting with a lowest weight ordered SDID prior to a higher weighted ordered SDID, and modifying each of the plurality of SDID records and SDID records associated with the at least one other SDID to include a cross-reference to each SDID in the plurality of SDIDs and the at least one other SDID.

* * * * *